US011922780B2

(12) United States Patent
Shigeta

(10) Patent No.: US 11,922,780 B2
(45) Date of Patent: *Mar. 5, 2024

(54) METHOD FOR ADMINISTERING A PACKAGE OF SHUFFLED PLAYING CARDS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/866,799

(22) Filed: Jul. 18, 2022

(65) Prior Publication Data

US 2022/0351586 A1 Nov. 3, 2022

Related U.S. Application Data

(63) Continuation of application No. 17/314,480, filed on May 7, 2021, now Pat. No. 11,557,181, which is a (Continued)

(30) Foreign Application Priority Data

Aug. 8, 2013 (AU) ................................ 2013213710
Mar. 24, 2014 (AU) ................................ 2014201757

(51) Int. Cl.
*G07F 17/32* (2006.01)
*A63F 1/06* (2006.01)
(Continued)

(52) U.S. Cl.
CPC .......... *G07F 17/3293* (2013.01); *A63F 1/062* (2013.01); *A63F 1/18* (2013.01);
(Continued)

(58) Field of Classification Search
CPC ........ A63F 1/062; A63F 1/18; A63F 3/00157; A63F 2009/2419; A63F 2009/2489;
(Continued)

(56) References Cited

U.S. PATENT DOCUMENTS 4,814,589 A * 3/1989 Storch .................... G06K 19/04
211/49.1
5,282,679 A * 2/1994 Redelinghuys ........ A47B 77/10
312/316
(Continued)

FOREIGN PATENT DOCUMENTS

AU 2011294601 A1 1/2013
CA 2132666 A1 3/1996
(Continued)

OTHER PUBLICATIONS

U.S. Notice of Allowance dated Mar. 22, 2023 issued for U.S. Appl. No. 17/509,511.
(Continued)

*Primary Examiner* — David L Lewis
*Assistant Examiner* — Matthew D Hoel
(74) *Attorney, Agent, or Firm* — NORTON ROSE FULBRIGHT US LLP

(57) ABSTRACT

Administrating a package of shuffled playing cards to prevent fraudulent card exchanges. The administrating system is configured to calculate places and a number of packages of shuffled playing cards at places of the backyard, the places of playing tables, places of carriers and the disposition place using information obtained by the loading step and unloading step and the administrating system calculates by every ID codes bases 1) places of packages registered by the registering step for registering to a data base of administrating system and a number of packages place by place from information obtained from the loading step and the
(Continued)

unloading step. The administrating system is configured to recognize whether there is a lost package by comparing the information of all ID codes registered in registering steps with the ID codes at places of packages obtained at the calculating step from the loading step and the unloading step.

17 Claims, 21 Drawing Sheets

Related U.S. Application Data continuation of application No. 16/923,902, filed on Jul. 8, 2020, now Pat. No. 11,210,908, which is a continuation of application No. 16/451,700, filed on Jun. 25, 2019, now Pat. No. 10,755,532, which is a continuation of application No. 15/788,356, filed on Oct. 19, 2017, now Pat. No. 10,546,465, which is a continuation of application No. 14/455,241, filed on Aug. 8, 2014, now Pat. No. 10,553,078.

(51) Int. Cl.
*A63F 1/18* (2006.01)
*A63F 3/00* (2006.01)
*A63F 9/24* (2006.01)

(52) U.S. Cl.
CPC ........ *G07F 17/322* (2013.01); *G07F 17/3241* (2013.01); *A63F 3/00157* (2013.01); *A63F 2009/2419* (2013.01); *A63F 2009/2489* (2013.01); *A63F 2250/58* (2013.01)

(58) Field of Classification Search
CPC ............. A63F 2250/58; G07F 17/3293; G07F 17/322; G07F 17/3241
See application file for complete search history.

(56) References Cited

U.S. PATENT DOCUMENTS 5,735,742 A * 4/1998 French .................. G07F 7/0866 273/138.2
6,039,650 A * 3/2000 Hill ........................... A63F 1/14 463/47
6,273,817 B1 * 8/2001 Sultan ................... A63F 3/0665 273/269
6,335,685 B1 * 1/2002 Schrott .............. G06K 19/0723 340/8.1
6,527,191 B1 * 3/2003 Jannersten ................ A63F 1/02 235/487
6,600,418 B2 * 7/2003 Francis .................. G06K 17/00 700/229
6,621,053 B1 * 9/2003 Wensink ................. F24C 15/16 99/399
6,629,894 B1 * 10/2003 Purton ...................... A63F 1/06 463/47
7,055,690 B1 * 6/2006 Valdez ...................... A47F 3/14 206/215
7,106,606 B2 * 9/2006 Stephelbauer ...... H03F 3/45098 363/73
7,108,606 B1 * 9/2006 Luciano .............. G07F 17/3216 361/679.57
7,357,321 B2 * 4/2008 Yoshida ................... G06K 7/10 463/36
7,448,485 B1 * 11/2008 Rutler .................... A44C 21/00 40/27.5
7,492,267 B2 * 2/2009 Bilyeu ................... G06K 17/00 340/568.1
7,762,889 B2 * 7/2010 Shigeta ..................... A63F 1/18 273/149 R
7,967,672 B2 * 6/2011 Shigeta ..................... A63F 1/18 235/468
8,033,548 B2 * 10/2011 Shigeta ..................... A63F 1/14 273/303
8,192,278 B2 * 6/2012 Yoshizawa .......... G07F 17/3267 463/16
8,371,583 B2 * 2/2013 Shigeta ..................... A63F 1/02 273/293
8,387,983 B2 * 3/2013 Shigeta ..................... A63F 1/10 273/293
10,192,085 B2 * 1/2019 Shigeta .................... G07D 5/08
10,220,300 B2 * 3/2019 Shigeta ............... G07F 17/3293
10,252,147 B2 * 4/2019 Shigeta ............... G07F 17/3241
10,493,357 B2 * 12/2019 Shigeta ................... A63F 1/062
10,546,465 B2 * 1/2020 Shigeta ................... A63F 1/062
10,553,078 B2 * 2/2020 Shigeta ................... A63F 1/062
10,607,452 B2 * 3/2020 Shigeta ............... G07F 17/3241
10,665,054 B2 * 5/2020 Shigeta ................... G07F 17/32
10,675,530 B2 * 6/2020 Shigeta ..................... A63F 1/12
10,748,386 B2 * 8/2020 Shigeta ............... G07F 17/3293
10,755,532 B2 * 8/2020 Shigeta ................. G07F 17/322
10,874,934 B2 * 12/2020 Shigeta ................. G07F 17/322
11,049,363 B2 * 6/2021 Shigeta ................ H05K 7/1401
11,052,304 B2 * 7/2021 Shigeta ............... G07F 17/3216
11,210,908 B2 * 12/2021 Shigeta ................... A63F 1/062
11,484,778 B2 11/2022 Yoshida
2002/0042298 A1 * 4/2002 Soltys ................ G06Q 10/0639 463/29
2002/0068635 A1 * 6/2002 Hill ........................... A63F 1/14 463/47
2002/0155869 A1 * 10/2002 Soltys ....................... A63F 1/18 463/11
2003/0022708 A1 * 1/2003 Yano ......................... A63F 1/00 463/11
2003/0064798 A1 * 4/2003 Grauzer .............. G07F 17/3211 463/29
2003/0195025 A1 * 10/2003 Hill ........................... A63F 1/18 463/11
2004/0026636 A1 * 2/2004 Shigeta ................. B07C 5/3422 250/556
2004/0056091 A1 3/2004 Overhultz et al.
2004/0219982 A1 * 11/2004 Khoo ...................... G07F 17/32 463/42
2005/0026683 A1 * 2/2005 Fujimoto ................. G07D 5/08 463/29
2005/0059479 A1 * 3/2005 Soltys .................... A44C 21/00 463/25
2005/0113166 A1 5/2005 Grauzer et al.
2005/0121852 A1 * 6/2005 Soltys ....................... A63F 1/18 463/9
2005/0137005 A1 * 6/2005 Soltys ....................... A63F 1/18 463/13
2005/0248088 A1 11/2005 Yoshida et al.
2005/0255905 A1 * 11/2005 Duke ...................... G07F 17/32 463/17
2005/0288083 A1 * 12/2005 Downs, III ......... G07F 17/3276 463/11
2006/0046812 A1 3/2006 Hiranoya et al.
2006/0247036 A1 * 11/2006 Shigeta ..................... A63F 1/18 273/148 R
2007/0024449 A1 * 2/2007 Bilyeu ................... G06K 17/00 340/573.1
2007/0026949 A1 * 2/2007 Charlier .............. G07F 17/3251 463/47
2007/0060311 A1 * 3/2007 Rowe .................. G07F 17/3251 463/25
2007/0077987 A1 * 4/2007 Gururajan ............. G07F 17/322 463/22
2007/0178955 A1 * 8/2007 Mills ......................... A63F 1/18 463/13
2007/0184898 A1 * 8/2007 Miller .................... G07D 9/002 463/29
2007/0268138 A1 * 11/2007 Chung ............... G08B 13/2462 340/572.1
2008/0040246 A1 * 2/2008 Fukamachi .......... B65G 1/1373 705/29

(56) References Cited

U.S. PATENT DOCUMENTS

2008/0041932 A1* 2/2008 Christophersen ...... G07D 11/60 235/379
2008/0105750 A1* 5/2008 Shigeta ...................... A63F 1/18 235/468
2008/0110996 A1* 5/2008 Shigeta ............... G07F 17/3232 235/494
2008/0113783 A1* 5/2008 Czyzewski ............. G07F 17/32 463/43
2008/0174423 A1* 7/2008 Breed ..................... G01S 15/42 340/539.22
2008/0188292 A1* 8/2008 Walker ................ G07F 17/3244 463/25
2008/0277871 A1* 11/2008 Saheki .................... A63F 3/062 273/269
2008/0303210 A1* 12/2008 Grauzer .............. G07F 17/3225 273/149 R
2009/0048010 A1* 2/2009 Kroeckel ............ G07F 17/3248 463/16
2009/0075725 A1* 3/2009 Koyama ............... G07F 17/322 463/25
2009/0134575 A1* 5/2009 Dickinson ............... A63F 1/062 273/149 R
2009/0191933 A1* 7/2009 French ...................... A63F 1/18 463/46
2009/0233699 A1* 9/2009 Koyama ................. G07F 17/32 463/31
2009/0243213 A1* 10/2009 Pececnik ................... A63F 1/12 273/149 R
2009/0265105 A1* 10/2009 Davis ...................... G07F 17/32 348/113
2010/0093428 A1* 4/2010 Mattice ............... G07F 17/3239 463/25
2010/0105486 A1* 4/2010 Shigeta .................. A44C 21/00 463/47
2010/0113118 A1* 5/2010 Shigeta ............... G07F 17/3251 29/592.1
2010/0130288 A1* 5/2010 Shigeta .................. A44C 21/00 156/60
2010/0133754 A1* 6/2010 Shigeta ..................... A63F 1/14 273/293
2010/0222140 A1* 9/2010 Dewaal ............... G07F 17/3293 463/43
2010/0234102 A1* 9/2010 Mori ................... G07F 17/3293 463/43
2010/0240446 A1* 9/2010 Koyama ............. G07F 17/3248 463/25
2010/0285869 A1* 11/2010 Walker ................ G07F 17/3251 463/16
2010/0314834 A1* 12/2010 Shigeta ..................... A63F 1/18 273/293
2010/0327525 A1* 12/2010 Shigeta ..................... A63F 1/02 463/47
2011/0052049 A1* 3/2011 Rajaraman ................ G06T 7/12 382/165
2011/0127722 A1* 6/2011 Emori ................. G07F 17/3241 463/43
2011/0130185 A1* 6/2011 Walker ................ G07F 17/3202 463/13
2011/0210175 A1* 9/2011 Shigeta ..................... A63F 1/18 235/491
2011/0234385 A1 9/2011 Tarrant et al.
2012/0080845 A1 4/2012 Emori et al.
2012/0208622 A1* 8/2012 Delaney ................ G07F 17/322 463/25
2012/0241344 A1* 9/2012 Gronau ................. G07F 7/0893 206/445
2012/0252564 A1* 10/2012 Moore ................ A63F 3/00157 463/25
2013/0134673 A1* 5/2013 Shigeta ..................... A63F 1/18 273/148 R
2013/0161905 A1* 6/2013 Grauzer .................... A63F 1/18 273/149 R
2013/0233923 A1* 9/2013 Hoyt ........................ H01Q 7/08 235/492
2013/0292902 A1* 11/2013 Shigeta ..................... A63F 1/18 273/148 R
2013/0313776 A1* 11/2013 Gelinotte ............ G07F 17/3248 273/148 R
2013/0316797 A1* 11/2013 Gelinotte ............ G07F 17/3244 463/25
2014/0033660 A1* 2/2014 Shigeta .................... B65D 5/54 206/315.1
2014/0057703 A1* 2/2014 LeStrange ........... G07F 17/3255 463/25
2014/0291399 A1* 10/2014 Koyama ............ G06K 7/10336 235/439
2014/0332595 A1* 11/2014 Moreno .................... G07F 7/02 235/488
2015/0042042 A1* 2/2015 Shigeta ................... A63F 1/062 273/148 R
2015/0136562 A1* 5/2015 Fujita ..................... G07D 11/16 194/206
2015/0141125 A1* 5/2015 LeStrange ........... G07F 17/3286 463/25
2015/0141126 A1* 5/2015 Hoyt .................. G06K 19/0723 463/25
2015/0258420 A1* 9/2015 Shigeta ..................... A63F 1/18 273/148 A
2015/0312517 A1* 10/2015 Hoyt ........................ H04N 5/77 386/226
2015/0356825 A1* 12/2015 Okada ..................... G07F 17/32 463/25
2018/0047256 A1* 2/2018 Shigeta ................... A63F 1/062
2018/0122192 A1* 5/2018 Shigeta ............... G07F 17/3293
2018/0268662 A1* 9/2018 Shigeta ................. G07F 17/322
2019/0318584 A1* 10/2019 Shigeta ................... A63F 1/062
2020/0342719 A1* 10/2020 Shigeta ............... G07F 17/3293
2021/0264739 A1* 8/2021 Shigeta ..................... A63F 1/18
2021/0343123 A1* 11/2021 Shigeta ............... G07F 17/3241

FOREIGN PATENT DOCUMENTS

CN 1743039 A 3/2006
CN 1820276 A 8/2006
CN 1890004 A 1/2007
CN 101318072 A 12/2008
CN 101378816 A 3/2009
CN 101495198 A 7/2009
CN 101711177 A 5/2010
CN 101732850 A 6/2010
CN 101873880 A 10/2010
CN 101959563 A 1/2011
CN 102125756 A 7/2011
CN 102159289 A 8/2011
CN 102307633 A 1/2012
CN 102413884 A 4/2012
CN 102892472 A 1/2013
CN 102902992 A 1/2013
CN 103170132 A 6/2013
CN 103768786 A 5/2014
EP 2228106 A1 9/2010
EP 2228106 B1 2/2013
FR 1116180 A 5/1956
JP 2004-299878 A 10/2004
JP 2005046621 A 2/2005
JP 2007-018067 A 1/2007
JP 2007065950 A 3/2007
JP 2007-167248 A1 7/2007
JP 2007213105 A 8/2007
JP 2008081238 A 4/2008
JP 2009-227382 A 10/2009
JP 2011024603 A 2/2011
JP 2011098831 A 5/2011
JP 2011115266 A 6/2011
JP 2012075781 A 4/2012
JP 2012144855 A 8/2012
JP 2014031217 A 2/2014
PH 1-2016-501899 A1 1/2017
WO 9729818 A1 8/1997

(56) References Cited

FOREIGN PATENT DOCUMENTS

| | | | |
|---|---|---|---|
| WO | 9925439 | A1 | 5/1999 |
| WO | 2004086337 | A2 | 10/2004 |
| WO | 2005/035084 | | 4/2005 |
| WO | 2005035084 | A1 | 4/2005 |
| WO | 2007065950 | A | 3/2007 |
| WO | 2007067213 | A2 | 6/2007 |
| WO | 2009026110 | A2 | 2/2009 |
| WO | 2009126780 | A2 | 10/2009 |
| WO | 2009126780 | A3 | 10/2009 |
| WO | 2010055328 | A1 | 5/2010 |
| WO | 2010056562 | A1 | 5/2010 |
| WO | 2012026131 | A1 | 3/2012 |
| WO | 2013/172083 | A1 | 11/2013 |
| WO | 2013172038 | A1 | 11/2013 |
| WO | 2015019619 | A1 | 2/2015 |
| WO | 2015/145499 | A1 | 10/2015 |

OTHER PUBLICATIONS

Chinese Office Action dated Nov. 18, 2022 issued for CN Application No. 201910588902.4.
U.S. Office Action on U.S. Appl. No. 15/986,378, dated May 16, 2019.
U.S. Final Office Action on U.S. Appl. No. 15/788,356, dated Mar. 22, 2019.
Office Action on U.S. Appl. No. 14/455,241, dated Mar. 8, 2019.
Office Action on CN Patent Application No. 2014103905509, dated Jan. 30, 2019.
Examination Report No. 3 on AU Patent Application No. 2017204645, dated Jan. 29, 2019.
Office Action on PH Patent Application No. 1/2017/502419, dated Aug. 1, 2018.
Office Action U.S. Appl. No. 15/128,651, dated May 2, 2018.
Notice of 1st Office Action on CN Patent Application No. 201480044891.9, dated May 4, 2018.
European Search Report on EP Patent Application No. 18153556.8, dated May 14, 2018.
Office Action on JP Patent Application No. 2017-124693, dated Jun. 26, 2018.
Notice of Allowance on JP Patent Application No. 2014-162833, dated Mar. 6, 2018.
Rejection on KR Patent Application No. 10-2016-7023313, dated Apr. 25, 2018.
Office Action on JP2016-509612, dated Feb. 27, 2018.
U.S. Office• Action, U.S. Appl. No. 15/128,651, dated Dec. 27, 2017.
European Patent Application No. 14887421.7, Search Report dated Dec. 1, 2017.
U.S. Appl. No. 14/455,241, Final Office Action dated Dec. 29, 2017.
European Patent Application No. 14179992.4, Search Report dated Oct. 21, 2014.
International Application No. PCT/JP2014/004127, International Search Report dated Oct. 21, 2014.
International Application No. PCT/JP2014/005320, International Search Report dated Dec. 9, 2014.
New Zealand First Examination Report, NZ Application No. 724658, dated Feb. 7, 2017.
Singapore Office Action, Singapore Application No. 10201404777Q, dated Feb. 8, 2017.
Japanese Office Action, Japanese Application No. 2016509612, dated May 30, 2017.
U.S. Office Action, U.S. Appl. No. 14/455,241, dated Jul. 6, 2017.
Korean Office Action, Korean Application No. 10-2016-7023313, dated Nov. 6, 2017.
Chinese Office Action on CN Patent Application No. 2014103905509, dated Jan. 30, 2019.
Filipino Notice of Allowance on PH Application 1/2016/500247, dated Oct. 8, 2019.
Japanese Office Action JP Application 2018-153985, dated Oct. 8, 2019.
Chinese Office Action on CN Patent Application 201710351625.6, dated Mar. 4, 2020.
Chinese Office Action on CN Patent Application 201710351495.6, dated Mar. 4, 2020.
U.S. Notice of Allowance on U.S. Appl. No. 15/788,401, dated Apr. 9, 2020.
Notice of Allowance on U.S. Appl. No. 16/294,183, dated Aug. 26, 2020.
Notice of Allowance dated Dec. 17, 2020 issued in PH Application 1-2017-500924.
Notice of Allowance dated Dec. 17, 2020 issued in PH Application 1-2017-500925.
Office Action dated Mar. 24, 2021 issued in NZ Application 745908.
Notice of Allowance dated Apr. 1, 2021 issued in CN Application 201710351625.6.
European Search Report on EP Patent Application 21173180.7 dated Aug. 13, 2021.
U.S. Notice of Allowance on U.S. Appl. No. 16/923,902 dated Jul. 29, 2021.
European Search Report on EP Patent Application 21183852.9 dated Oct. 20, 2021.
Chinese Office Action on CN Patent Application 201910108880.7 dated Mar. 1, 2022.
Extended Search Report for application EP 22163559.2, dated Jul. 7, 2022.
Extended Search Report for application EP 22169909.3, dated Jul. 18, 2022.
Japanese Office Action for application 2022-018407, dated Sep. 13, 2022.
European Search Report application issued for EP application 22163559.2, dated Jul. 7, 2022.
European Search Report application issued for EP application 22169909.3, dated Jul. 18, 2022.
Japanese Office Action issued for for JP application 2022-018407, dated Sep. 13, 2022.
Japanese Office Action dated Aug. 15, 2023 issued for JP Application No. 2020-212099.
Chinese Office Action dated Oct. 18, 2023 issued for CN Application No. 202110047883.1.

* cited by examiner

METHOD FOR ADMINISTERING A PACKAGE OF SHUFFLED PLAYING CARDS

CROSS-REFERENCE TO RELATED APPLICATIONS

The present application is a continuation of U.S. application Ser. No. 17/314,480 filed May 7, 2021, which is a continuation of U.S. application Ser. No. 16/923,902 filed Jul. 8, 2020 (now U.S. Pat. No. 11,210,908), which is continuation of U.S. application Ser. No. 16/451,700 filed Jun. 25, 2019 (now U.S. Pat. No. 10,755,532), which is a continuation of U.S. application Ser. No. 15/788,356 filed Oct. 19, 2017 (now U.S. Pat. No. 10,546,465), which is a continuation of U.S. application Ser. No. 14/455,241 filed Aug. 8, 2014 (now U.S. Pat. No. 10,553,078), which claims priority to AU Application No. 2013213710 filed Aug. 8, 2013 and AU Application No. 2014201757 filed Mar. 24, 2014, which are each incorporated by reference herein.

TECHNICAL FIELD

The present invention relates to a method for administrating a package of shuffled playing cards in casinos or other card game facilities using card game tables to prevent packages of cards from being lost or replaced during operation of casinos which use a large number of packages of cards.

BACKGROUND ART

Baccarat and Black Jack are of the many live table games played in casinos or gaming establishments. These games use a standard deck of 52 playing cards and are usually dealt from a shoe having multiple decks (6 to 9 or 10 decks) that have been shuffled together prior to the beginning of play. When operating people (hereinafter "the dealer") in casinos deliver playing cards to a game table for plays in such games, the cards sequence of multiple decks from the shoe will decide games (winners or winning hands). A predetermined number of decks of game cards are shuffled in a random order (sequence) and individually packaged as one package for these purposes before casinos use these packages.

Any loss or exchange of cards should not occur in casinos, because once some one reads the sequence of the package of cards and return the package in casinos, one can predict the results of games when dealer uses the read package. To assure fair games by preventing such loss or exchanges of package of shuffled game cards in casinos, the casinos should administrate package of shuffled game cards so that games at tables are played properly (i.e. there is no exchange of the package of shuffled game cards or any other accidental or fraudulent acts etc.). A package of shuffled game cards is known and is disclosed in Patent Literature 1: (US Patent Publication 2010/0327525).

PATENT LITERATURE

[Patent Literature 1] US Patent Application Publication No. 2010/0327525.

Technical Problem

Various embodiments provide a real-time monitoring of the package of shuffled game cards in casinos and enables the casino to stop a game immediately when something unexpected happens by administrating the whole package of shuffled game cards in casinos. This administrating is important because he or she may know the sequence of the shuffled playing cards on the table once it had been lost in the casino.

Various embodiments have been made in view of the above problem, and aims to provide a package of shuffled game cards monitoring system with which it is possible to allow a casino to stop any suspicious package of shuffled game cards in the casino, by administrating the whole package of shuffled game cards in casinos.

During operation, people in casinos distribute the packages of playing cards to game tables for plays, any loss of package or an exchange of packages should not occur. For example, if some of cards or whole package of cards in which the sequence of these cards are preliminary read or exchanged by someone during a delivery of packages to a game table, he or she may win the games at the table to which the exchanged or read package delivered.

Solution to Problem

To solve the above conventional problems, various embodiments provide a system for administrating a package of shuffled playing cards, wherein a predetermined number of decks of game cards are shuffled in a random order and individually packaged as one package, a unique ID code is attached to the package of each unique shuffled game card, the system having: one or more ID code reader(s) for reading all of ID codes of the packages which have been brought into a pit for a game table, an administrating controller for monitoring each ID code of all existing packages of shuffled game cards at the pit with obtaining each ID codes of all existing packages of shuffled game cards at the pit by the ID code reader(s), the ID code reader(s) is also disposed at the game table for reading the ID code of the packages at the game table to identify the package which will be the next use for a card dealing shoe, wherein, the ID codes of the packages for the next use is examined whether it is the one properly arrived on the game table or the one arrived at proper timing or period of time by the administrating controller.

To solve the above conventional problems, various embodiments provide a method for administrating a package of shuffled playing cards, wherein a predetermined number of decks of game cards are shuffled in a random order and individually packaged as one package, a unique ID code is attached to the package of each unique shuffled game card, and the packages of shuffled game cards are carried from a backyard to pits for game tables and game tables, the method having: a registering step for registering all of ID codes of the packages which have been brought into a back yard in a data base, an administrating step for reading all of the ID codes of packages which have been brought into a pit and monitoring each ID code of all existing packages of shuffled game cards at the pit by obtaining each ID codes of all existing packages of shuffled game cards at the pit by ID code reader(s), wherein, in the administrating step at the pit all of ID codes of the packages is examined whether it is the one preliminarily brought into the back yard and having been registered in the data base or not.

The method for administrating a package of shuffled game cards according to various embodiments discussed herein, the registered ID codes of the packages in the data base may be deleted or acknowledged as after having used when the ID code of the package is read by an ID code reader at the game table. The ID codes of the packages read for the next use may be examined by the administrating controller whether it is the one properly arrived on the game table or the one arrived at proper timing or period of time that may be properly arrived on the game table or the one arrived at proper timing or period of time by judging at least one of the following:

1) whether it was carried through predetermined delivery route,
2) whether it was missing one,
3) whether it has not been registered,
4) whether it has been unused in the pit more than predetermined period,
5) whether it was carried from unexpected pit or without passing any pit,
6) whether it had been used at any of game tables in the past.

The method for administrating a package of shuffled game cards according to various embodiments discussed herein, the administrating step further may have a step for administrating whether or not all of registered ID codes of the packages in the data base have been deleted or acknowledged as after having used during certain period of time. A pallet ID or a carton ID may be used for registering ID codes of the packages which have been brought into the back yard. The administrating step further may have a step for administrating whether or not there is any package which has not been used at the game tables during certain period of time.

A keeping box for containing plurality of packages of shuffled game cards for the method for administrating a package of shuffled game cards according to various embodiments discussed herein may have reader(s) for reading the ID codes of packages of shuffled game cards in the keeping box, a communication means for sending information obtained by the reader to outside the keeping box and a lock means to prevent taking off the package from the keeping box.

DESCRIPTION OF EMBODIMENTS

Figure 1:
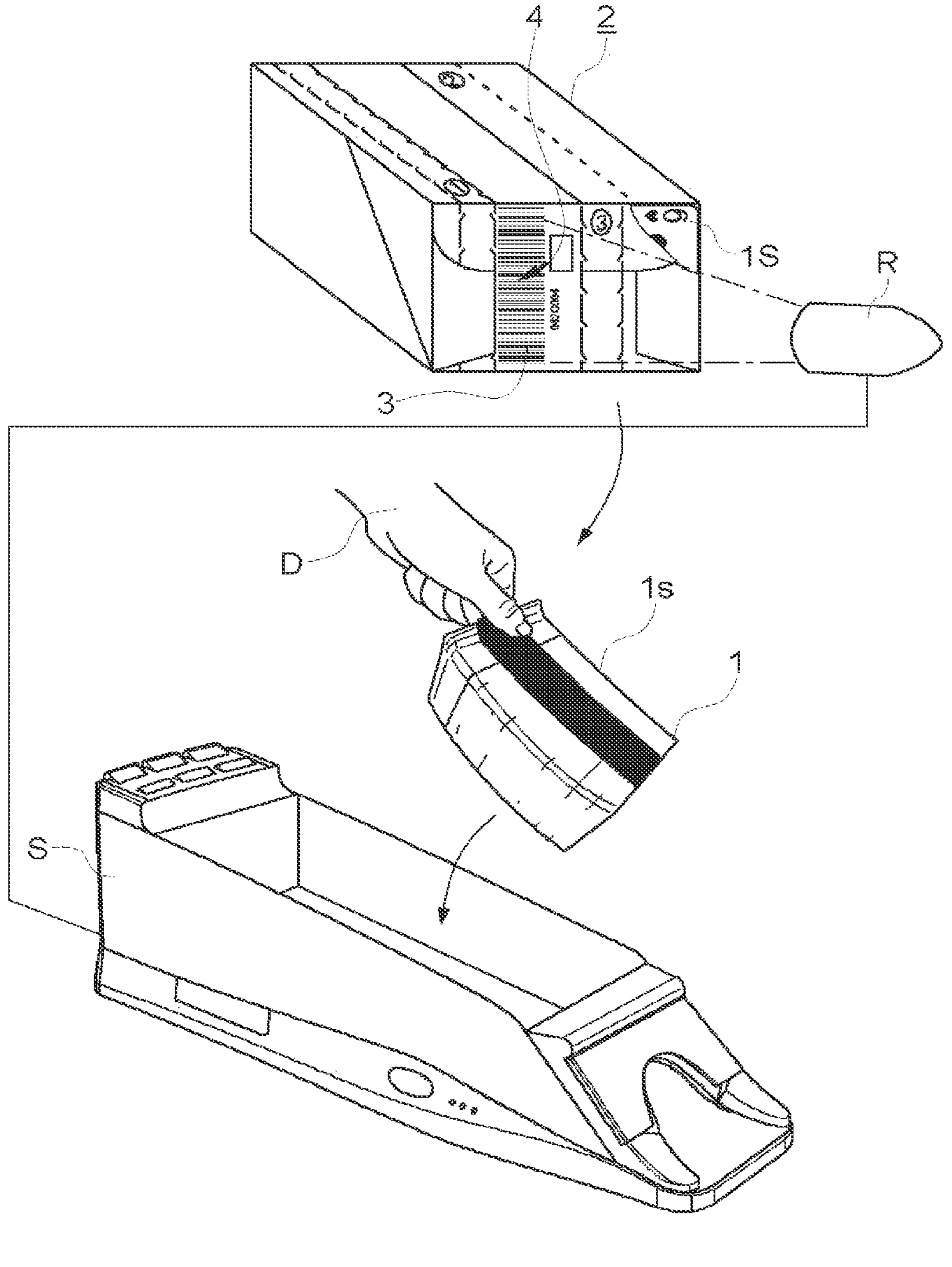
FIG. 1 is a perspective view of a package and an unpackaged shuffled playing cards to be used in a card dealing shoe of the system for administrating a package of shuffled playing cards.
Figure 2:
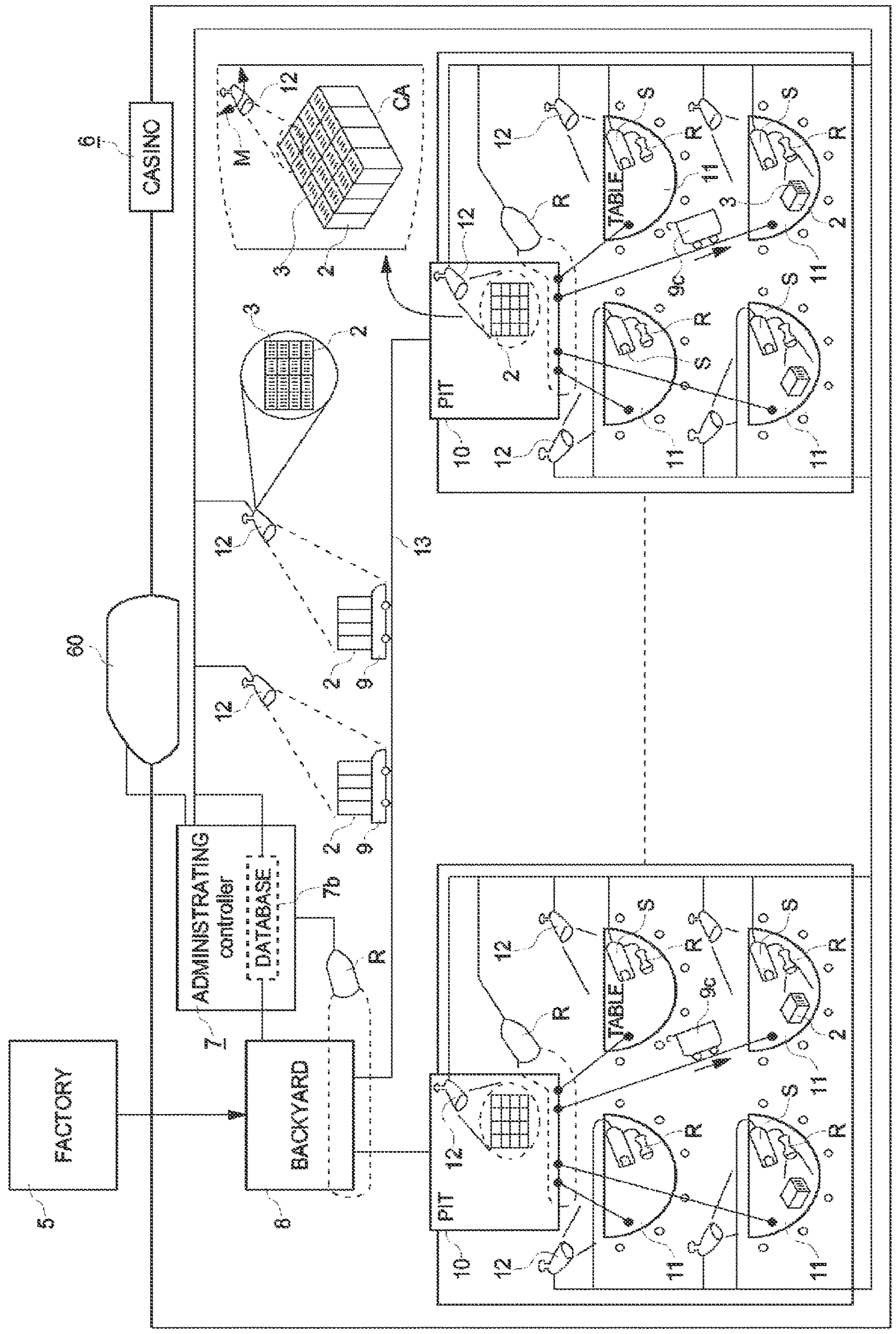
FIG. 2 is a diagram schematically showing the entirety of a system for administrating a package of shuffled playing cards.

An embodiment of a system for administrating a package of shuffled playing cards will be described below. FIG. 1 is a perspective view of a package of shuffled playing cards and a card dealing shoe to be used in table games in casinos. FIG. 2 is a diagram schematically showing the entirety of a system for administrating a package of shuffled playing cards in casinos according to various embodiments discussed herein.

The cards 1 of each shuffled playing cards 1*s*, which made up of a predetermined number of decks (normally, 6, 8, 9 or 10 decks), are shuffled in a random order to be arranged in a unique and random arrangement order and packaged as package 2 with a uniquely identifiable shuffled card ID (as a bar code 3 or a RFID tag etc.) as a ID code 4 in a factory 5. In this embodiment the ID code 4 is attached to the package 2 in a form of a barcode 3 (it may be 2-dimensional code like QR code) or a RFID tag etc. for a barcode reader R of a card dealing shoe S or other RFID tag reading means (not shown). The package 2 is sealed with a sealing material or a shrink packaging material in a factory 5 (see FIG. 2).

The administrating system 7 in casinos 6 is used for administrating whether or not any package 2 is lost or exceeding from ones accepted in a backyard 8 of casino 6. If there is any lost or missing of package 2 there might have been the case when someone had broken package 2 and read the order of cards in the package 2 or made their own cards mixed to or exchanged some cards in the package 2 to their falls cards preliminary arranged in a certain sequence and returned the package to the pit or tables of the casino be used at game tables to win games. To solve the above problems, the present administrating system 7 provides administrations or monitoring of all packages 2 of shuffled playing cards in casino 6.

The packages 2 with barcodes 3 as unique ID codes are supplied to a backyard 8 of casino 6. All of ID codes 4 of the packages 2 which have been brought into the backyard 8 are registered to a data base 7*b* (in memories etc.) of administrating system 7 (as a registering step for registering all ID code 4 to the data base). In this stage all of ID codes 4 (barcode 3 (it may be a 2-dimensional code like a QR code)) of the packages 2 which have been brought into the backyard 8 are registered for making the basic data base. To register all of ID codes of the packages 2 supplied to casinos 6 they may use a data from a factory or Carton ID 30 or pallet ID 40 instead of reading all of barcodes 3 of the packages. To register or read the ID code 4 the cameras 12 or reading devices for RFID tag (not shown) may be used instead of by the barcode reader R according to various embodiments discussed herein. The packages may be carried by cartons CA (and several cartons CA may be on a pallets PA) from the factory etc. which are containing 18 packages of shuffled playing cards 1*s* (see FIG. 3). The carton ID 30 or the pallet ID 40 may be used for registering ID codes of the packages 2 from the factory 5 which have been brought into the backyard 8.

Figure 3:
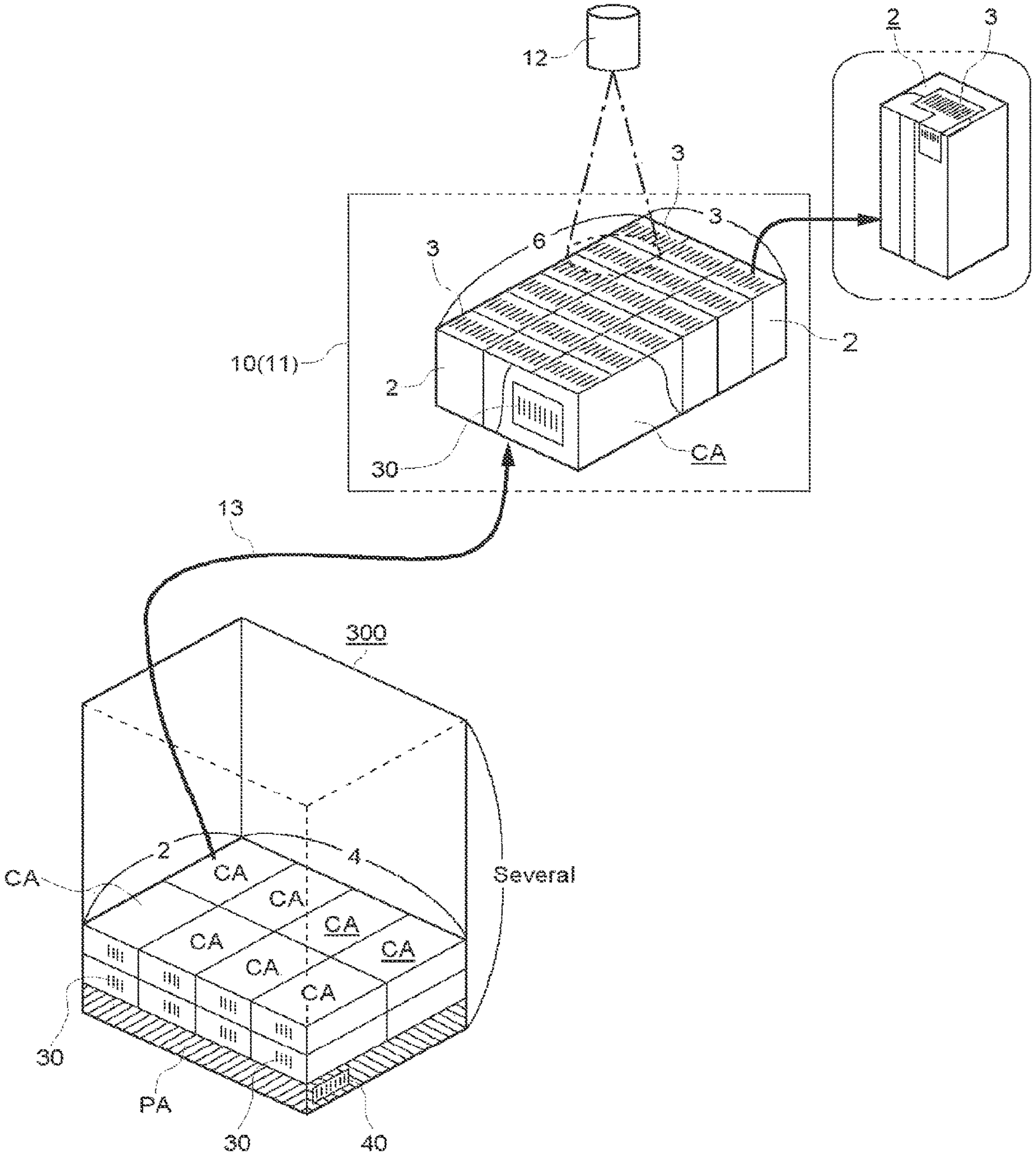
FIG. 3 is a perspective view of the shuffled playing cards to be carried from a factory to a backyard and pits of casino tables as a package or carton, of a pallet.

The packages 2 with barcodes 3 are stored in a carton CA and cartons CA are on a pallet PA during being delivered to casino 6 and stored at the backyard 8 (see FIG. 3). Unique carton ID 30 is attached to each carton CA and unique pallet ID 40 is attached to each pallet PA. The carton IDs 30 are preliminary registered in a data base 7*b* of administrating system 7 associated with the ID codes of the packages being stored in the carton CA. The pallet ID 40 is preliminary registered in the data base 7*b* of administrating system 7 associated with the cartons ID 30 and ID codes of the packages 2 on corresponding pallet PA. Every ID codes of the packages 2 are associated with the carton ID 30 and pallet ID 40 on which the packages 2 are stored.

Figure 17:
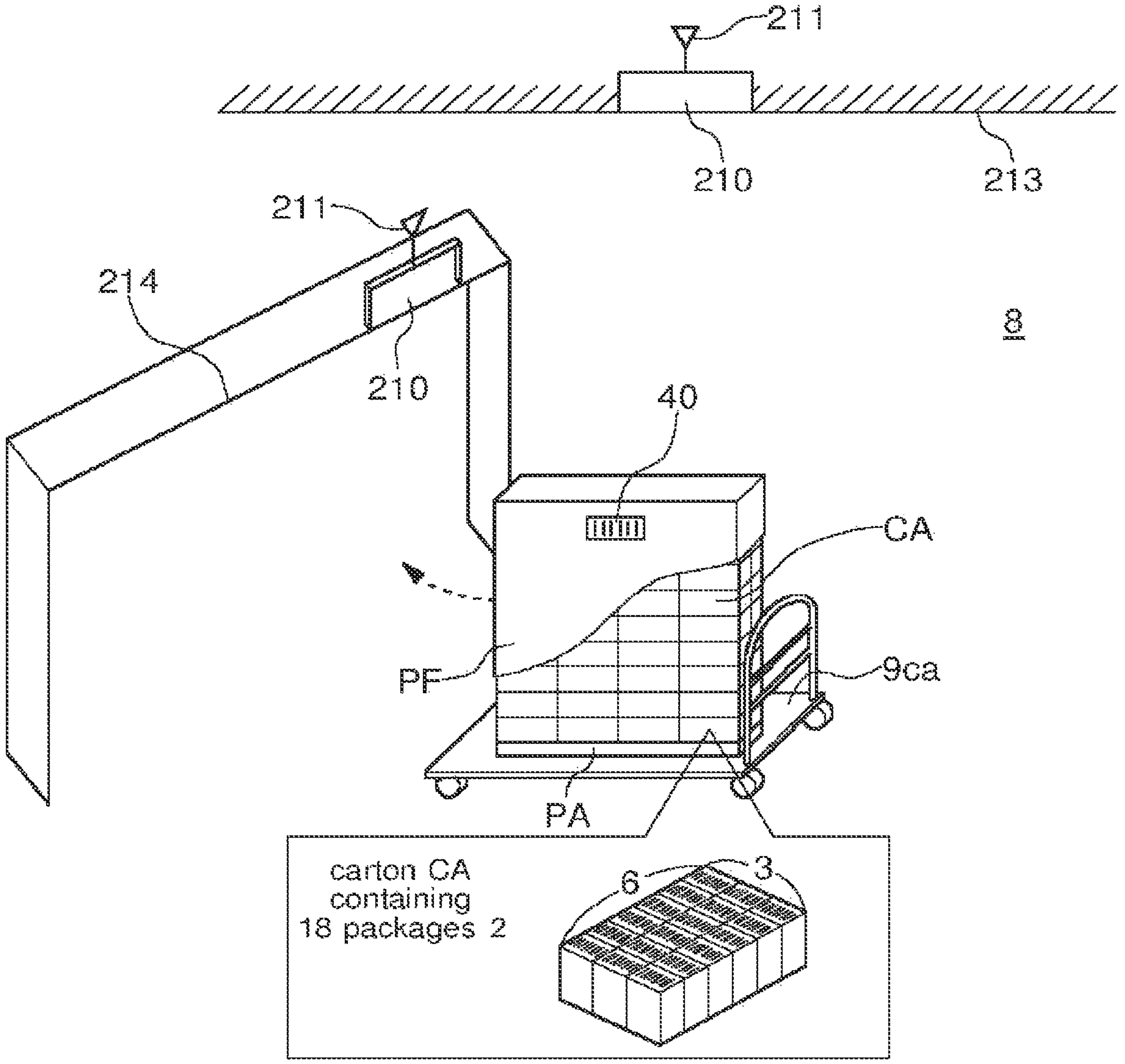
FIG. 17 shows a situation wherein cartons on pallets containing packages brought into a backyard with a cargo.

FIG. 17 shows the above situation wherein the cartons CA on the pallets PA containing packages 4 (not shown) brought into the backyard with a cargo 9*ca*. (For a typical example, a set of the cartons CA is wrapped with a thin plastic film PF and pallet ID 40 is attached to it.)

Existing actual ID codes of all of the packages 4 may be read from outside of the carton CA or the pallet PA or container 300 by reading device 210 as a reading step.

For example, the actual ID codes can be read all at once through antennas 211 remotely from the ceiling 213 and/or the gates 214 of the backyard and/or carrying paths (FIG. 17). Reading devices 210 have one or more large antennas 211 to read the ID codes remotely. Reading the actual ID codes from outside of the carton CA without opening wrappings of the carton CA enables keeping the ID codes clean and decreases the possibility of frauds in the backyard and/or carrying paths.

The packages 2 are delivered by plural vehicles 9, 9*c* from the backyard 8 to pits 10 and from the pits 10 to game tables 11 for game plays. All existing packages 2 in casino 6 are monitored with reading each ID codes of all existing packages 2 of shuffled playing cards at predetermined places by cameras 12 or the barcode reader R. The monitoring cameras 12 are disposed or equipped at places from the backyard 8 to pits 10 and game tables 11 so as to be able to read each and all barcodes 3 (as ID codes) of all existing packages 2 of shuffled playing cards in casinos 6.

In this embodiment multiple AGV (automatic guided vehicle) as vehicles 9 transfer the packages 2 of shuffled playing cards 1*s* from the backyard 8 to pits 10 for playing games. Multiple packages 2 (at least 16 packages) may be stored in each pits 10 and carried on the game tables 11 by other vehicles 9*c*. The AGV (vehicles 9) delivers multiple packages 2 from the backyard 8 to each pit 10 through programmed routes 13 in casino 6 wherein the vehicles 9 with packages 2 are monitored by administrating system 7 by using cameras 12 etc. at predetermined certain places of routes 13 in casino 6.

The administrating system 7 is achieved by a computer apparatus (as an administrating controller which has functions said below) and methods or process functions are achieved by installing in a computer with a program which is executed by a computer processor. The administrating system 7 performs the administration as follows:

1) Registering step for registering all of ID codes 4 of the packages 2 which have been brought into a back yard 8 in the data base 7*b*. To register all of ID codes of the packages 2 supplied to casinos 6 they may use a data from a factory or Carton ID 30 or pallet ID 40 instead of reading all of barcodes 3 of the packages or reading the ID code 4 by the cameras 12 or reading devices for RFID tag (not shown). The 2-dimensional code reader can be a QR code reader in various embodiments discussed herein;
2) An administrating step for reading all of the ID codes 4 of packages 2 which have been brought into the pit 10 and monitoring each ID code 4 of all existing packages 2 of shuffled game cards at the pit 10 by obtaining each ID codes 4 of all existing packages 2 of shuffled game cards at the pit 10 by ID code reader(s) R (the cameras 12 or other reading devices may be used).

In the administrating step at the pit 10 all of ID codes 4 of the packages 2 are examined whether it is the one preliminarily brought into the back yard 8 and having been registered in the data base 7*b* or not. The images obtained by the monitoring cameras 12 are sent to the administrating system 7 by communication device (by wire or wireless) and analyzed in administrating system 7, and every ID code of all packages 2 in the images, and ID codes monitored by monitoring cameras 12 or read by the barcode reader R are identified as the evidence of the actual existence at the pit 10. The images are obtained by the monitoring cameras 12 and sent at predetermined timing (like every 5 minutes or every 1 hour etc.). Administrating system 7 matches every ID codes 4 of all existing packages 2 obtained by the monitoring cameras 12 or read by barcode reader Rat each pit 10 with the registered ID codes 4 of the packages 2 in the data base 7*b* at predetermined timing (like every 5 minutes or every 1 hour etc.). The registered ID codes 4 of the packages 2 which are in the data base 7*b* were (are) the basic data which supposed to be existed in casino 6 as having been (or supposed to be) delivered to the backyard 8.

The ID codes 4 of the packages 2 at the pit 10 are checked every time when each package 2 has arrived at the pit 10 and left from the pit 10 for the monitoring. The packages 2 at the pit 10 are also monitored whether it is exist on the pit 10 or not at predetermined timing (ex. every one minute or 5 five minutes or one hour or more) by the administrating system 7. A keeping box may be used for containing plurality of packages 2 of shuffled game cards and monitoring ID codes 4 attached to the packages at the pit 10.

The packages 2 in the pits 10 will be carried to game tables 11 by vehicles 9*c* and the packages 2 are put on the game tables 11 for playing games (like Baccarat game). When the shuffled playing cards 1*s* is to be used in games on game tables 11, it is housed in a card dealing shoe S after the package 2 is undone to enable the cards of the shuffled playing cards is to be dealt one by one from the card dealing shoe S (FIG. 1). During the game, the dealer (D) deals the cards 1 from the card dealing shoe S onto a game table 11.

Just before breaking the package 2 on the game table 11, ID codes 4 of the packages 2 is read by the barcode reader R of the card dealing shoe S for the purpose of acknowledging the ID codes of the packages 2 as it is the one after use at each playing table 11. The registered ID codes 4 of the packages 2 in the data base will be deleted from the data base **7*b* or acknowledged and registered as after use at each game table 11 when the package 2 is selected for the next use of the games at playing table 11 and read by the barcode reader R. The ID codes 4 of the packages 2 read for the next use is sent to and examined by the administrating controller 7 whether the packages 2 is the one preliminarily expected to be on the game table 11 or the one arrived at preliminarily expected timing by judging at least one of the followings or any suspicious package 2 which is not proper one or the one expected to be on the game table 11** or not the one arrived at proper timing or period of time (not preliminarily expected timing):

1) whether it was carried through predetermined delivery route 13,
2) whether it have been missing one,
3) whether it has not been registered,
4) whether it has been unused in the pit 10 more than predetermined period,
5) whether it was carried from unexpected pit 10 or without passing any pit 10,
6) whether it had not been used at any of game tables 11 in the past.

The ID code reader (may be barcode reader R) is connected with the card dealing shoe S on the game table 11 or may be connected with a shuffle equipment (not shown) at the game table 11 and the examined results of the ID codes 4 of the packages 2 may be reported to the card dealing shoe S or a shuffle equipment about the existence of any suspicious package 2 for preventing the usage of the suspicious package 2 by the administrating controller 7. The card dealing shoe S or the shuffle equipment may have an output means for alarming or noticing the examined results of the ID code 4 of the package 2 for preventing the usage of the suspicious package 2 or locking further usage of the packages 2. The administrating step further may have a step for administrating whether or not all of registered ID codes 4 of the packages 2 in the data base **7*b* have been deleted or acknowledged as after having used at any of game tables 11 during certain period of time (whether or not there is any package 2** which has not been used at the game tables during certain period of time (one week or one month etc.)).

The ID code reader is directly or indirectly connected to the card dealing shoe S on the game table 11 and configured to send the ID code of the packages 2 to the administrating controller 7 to identify the ID code of the package 2 for the next use and the card dealing shoe S receives an instruction from the administrating controller 7.

Figure 4A:
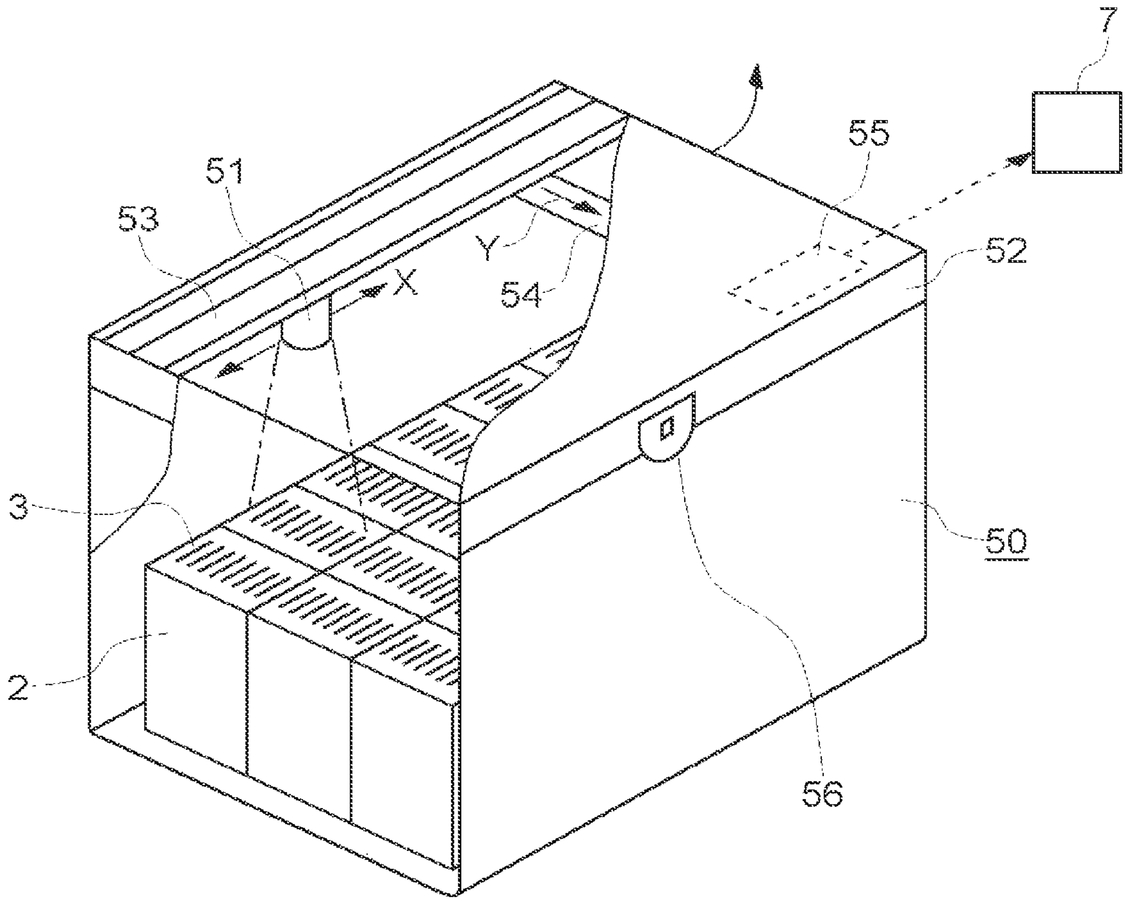
FIG. 4A is a perspective view showing a keeping box in which the keeping box can keep a plurality of packages and has one bar code reader.

A keeping box 50 for containing plurality of packages 2 of shuffled game cards for the method for administrating packages 2 of shuffled game cards may be used according various embodiments discussed herein. The packages 2 at the pit 10 may be monitored whether it is exist on the pit 10 or not at predetermined timing (ex. every one minute or 5 five minutes or one hour or more) by the administrating system 7 by using the keeping box (see FIG. 4) 50. The keeping box (see FIG. 4) 50 may have reader(s) 51 for reading all of the ID codes of packages 2 of shuffled game cards inside the keeping box 50 provided at a cover 52 of the keeping box 50. The reader(s) 51 of the keeping box 50 may be the barcode reader R or monitoring cameras 12 (or reading devices for RFID tag or QR code reader (not shown) may be used instead of by the barcode reader R). The reader(s) 51 are set to be able to scan X direction and Y direction to read all of the ID codes of packages 2 by scanning means 53, 54 (see FIG. 4) provided at the cover 52. A communication means 55 is also provided for sending information obtained by the reader 51 to outside the keeping box 50 (to the administrating controller 7 etc.). The keeping box 50 has a lock means 56 to prevent opening the cover 52 and taking off the packages 2 from the keeping box 50. Only during the lock means 56 is unlocked (opened the cover 52) by the authorized personnel in casino 6 they can put in and out the packages 2 from the keeping box 50. In various embodiments, the authorized personnel in casino 6 is the only person authorized to handle the lock means 56.

The keeping box 50 has a lock means 56 to prevent opening the cover 52 and the lock means 56 also may have an informing or alerting means (may be wireless) to inform a state that the cover 52 is opened. With being informed that the cover 52 has opened, (or any time) an image of the keeping box may be taken by the nearest monitoring cameras 12 to record these actions of taking off or in the packages 2 from the keeping box 50 by authorized personnel or other one. To record these actions (the opened state image of the keeping box), it may be confirmed the fact that the only during the lock means 56 is unlocked (the cover 52 is opened) by the authorized personnel, they can put in and out the packages 2 from the keeping box 50. The monitoring of these images, the existence of all packages 2 in the keeping box 56 is confirmed.

Figure 4B:
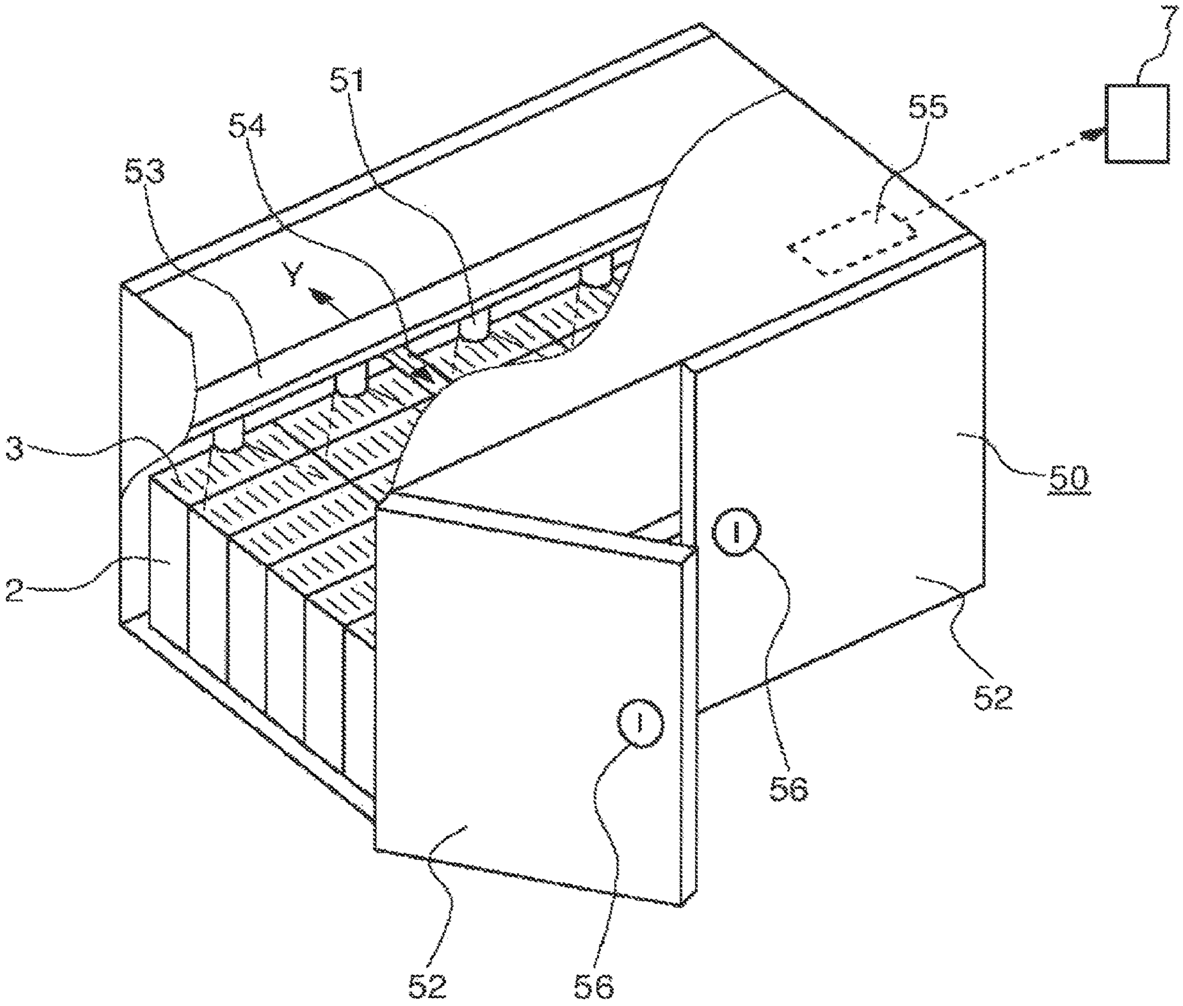
FIG. 4B is a perspective view showing a keeping box in which the keeping box can keep a plurality of packages and has a plurality of bar code readers.

Another embodiment of a keeping box 50 will be described in FIG. 4B. A keeping box 50 has plurality of readers 51 for reading ID code 3 at the inner upper part of the keeping box 50. By moving each scanning means 53 provided at the upper part of the keeping box 50 in Y direction, each ID code readers 51 move in Y direction and read all of the ID codes 3 of packages 2 in each row below each ID code readers 51. The keeping box 50 has the door (cover) 52 and the packages 2 can be put in and out by opening and closing of the door (cover) 52. The keeping box 50 has lock means 56 to prevent illegal taking off the packages 2. Furthermore, as an alternative idea, the keeping box 50 may have the same numbers of ID code readers at the inner upper part of the keeping box 50 as the maximum numbers of the packages 2 that can be contained in the keeping box 50.

Figure 4C:
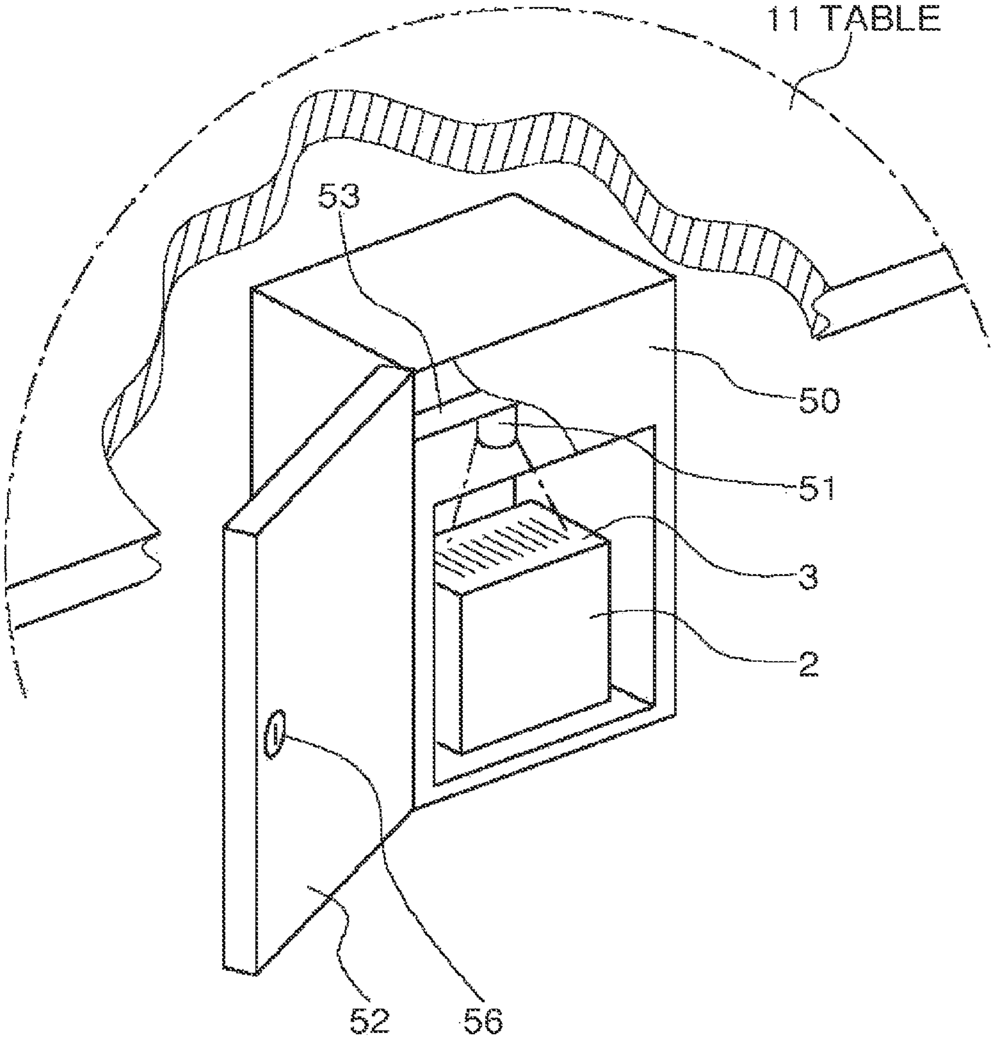
FIG. 4C is a perspective view showing a keeping box which the keeping box can keep the package for next game under the game table.

Another embodiment of a keeping box 50 will be described in FIG. 4C. A keeping box 50 can be put under a game table 11 and stock a package 2 for next game. The keeping box 50 has one ID code reader 51 for reading ID code 3 at the inner upper part of the keeping box 50. The ID code readers 51 can read the ID code 3 of the package 2.

In this embodiment multiple AGV (automatic guided vehicle) as vehicles 9 may transfer the packages 2 of shuffled playing cards **1*s* from the backyard 8 to pits 10 for playing games by using the keeping box 50. Multiple packages 2 (at least 18 packages) may be stored in each pits 10 in the keeping box 50. The ID codes of packages 2 obtained by the reader(s) 51 at the keeping box 50 are the evidence of the existing packages 2 in the pit 10**.

Administrating system 7 matches every ID codes 4 of all existing packages 2 obtained by the reader(s) 51 at each pit 10 with the registered ID codes 4 of the packages 2 in the data base **7*b* at predetermined timing (like every 5 minutes or every 1 hour etc.). The registered ID codes 4 of the packages 2 which are in the data base 7*b* were (are) the basic data which supposed to be existed in casino 6 as having been (or supposed to be) delivered to the backyard 8. By matching every ID codes of all existing packages 2 obtained in each pits 10 by the reader(s) 51 with the registered ID codes 4 of the packages 2 in the data base 7***b*, monitoring of all existing packages 2 at pits 10 are performed at predetermined timings (in every 5 minutes or less or more). The administrating system 7 can check whether there is any missing or excessive package 2 which is not supposed to be in the pits 10. The administrating system 7 may report results of the administrating (these matching results) of the above to an administration section of the casino 6.

These monitoring and capturing ID codes 4 may be able to check all of ID codes 4 by comparing with all of ID code with these having been brought into the backyard 8 as a new package whether or not all of the registered ID codes of the packages 2 of shuffled playing cards had been deleted as having used cards after the play of the games during an appropriate period of timing (ex. when they arrived to the backyard 8). If one of the ID of the package had been undeleted or acknowledged as having been used, this would mean that there is inappropriate or suspicious stock in casino.

The images obtained by the monitoring cameras 12 may be analyzed in administrating system 7 as follows:

1) Recognizing every barcodes 3 of ID codes of all packages 2 in the images. \
2) Reading barcodes 3 identified by barcode reading program as ID code.
3) Registering each ID codes with places read as the evidence of the existence at its places at predetermined timing like every 5 minutes or every 1 hour etc.
4) Matching every ID codes of all existing packages 2 obtained by the monitoring cameras 12 at predetermined places of the existing packages 2 with the registered ID codes of the packages 2 which are in the data base in the data base 7*b*.
5) Calculating whether all of the registered ID codes of the packages 2 which are in the data base supposed to be existed in casino 6 as having been delivered to the backyard 8 are exist or not or excessive ID codes of packages 2 obtained by the monitoring cameras 12 is exist or not.
6) The administrating system 7 may report results of the administrating of the above to an administration section of the casino 6.

The calculated ID codes=all ID codes of the packages 2 which have been brought (unloaded) into the backyard 8 and registered−(minuses) al of ID codes of the packages 2 which have been obtained by cameras 12 or by the barcode reader R including ID codes deleted or acknowledged as it is after use. These calculations are proceeded with at every place (the backyard 8, pits 10 for game tables 11 and game tables 11, all on vehicles 9 place by place bases). Reporting about ID codes and number of the lost packages which has (have) been recognized and of its place(s) at which the lost package had been existed (The last place founded). Every report with lost or excessive ID code or other monitored results existing numbers etc., may be displayed by monitor display 60 at administrating section etc.

At these steps for administrating a package 2 of shuffled playing cards, each ID codes of the packages 2 on the delivery route 13 and all vehicles 9 for carrying the packages 2 from the backyard 8 may be monitored by cameras 12 wherein the places of vehicles 9 are determined by sensors (not shown) and controlled by automatic guided vehicle system as known of as AGV system technology.

The administrating system 7 is programmed to monitor each of the ID code of the actual packages and may recognize the lost ID code at each place of game tables 11 or at other places by comparing all of existing actual ID codes at the places thereof with the registered ID codes at each place obtained by monitoring cameras by calculating and registering each identified ID codes at each place by place basis for all the places from the information obtained and analyzed by cameras 12 and the administrating system 7.

The method has further an administrating step for administrating a number of all actual packages 2 of shuffled playing cards at the backyard 8 and at every pits 10 for playing tables and game tables 11 and recognizing whether or not there is a lost package on any carrier 9 during the carrying step by comparing all of existing actual ID codes on each vehicles 9 with the information of all of ID codes of the packages of which being obtained when these packages have been brought into the backyard 8.

This administrating step is very important for safe operations of casinos. The administrating of all actual packages 2 of shuffled playing cards at the backyard 8 or at every pits 10 for playing tables or game tables 11 by recognizing whether or not there is a lost package or an additional package at every these places by comparing all of existing actual ID codes with the information of all of ID codes of the packages of which being obtained when these packages have been brought into the backyard 8 (or every pits 10 for playing tables or game tables 11) will make it sure that all of the packages in the casinos are under control.

Figure 5:
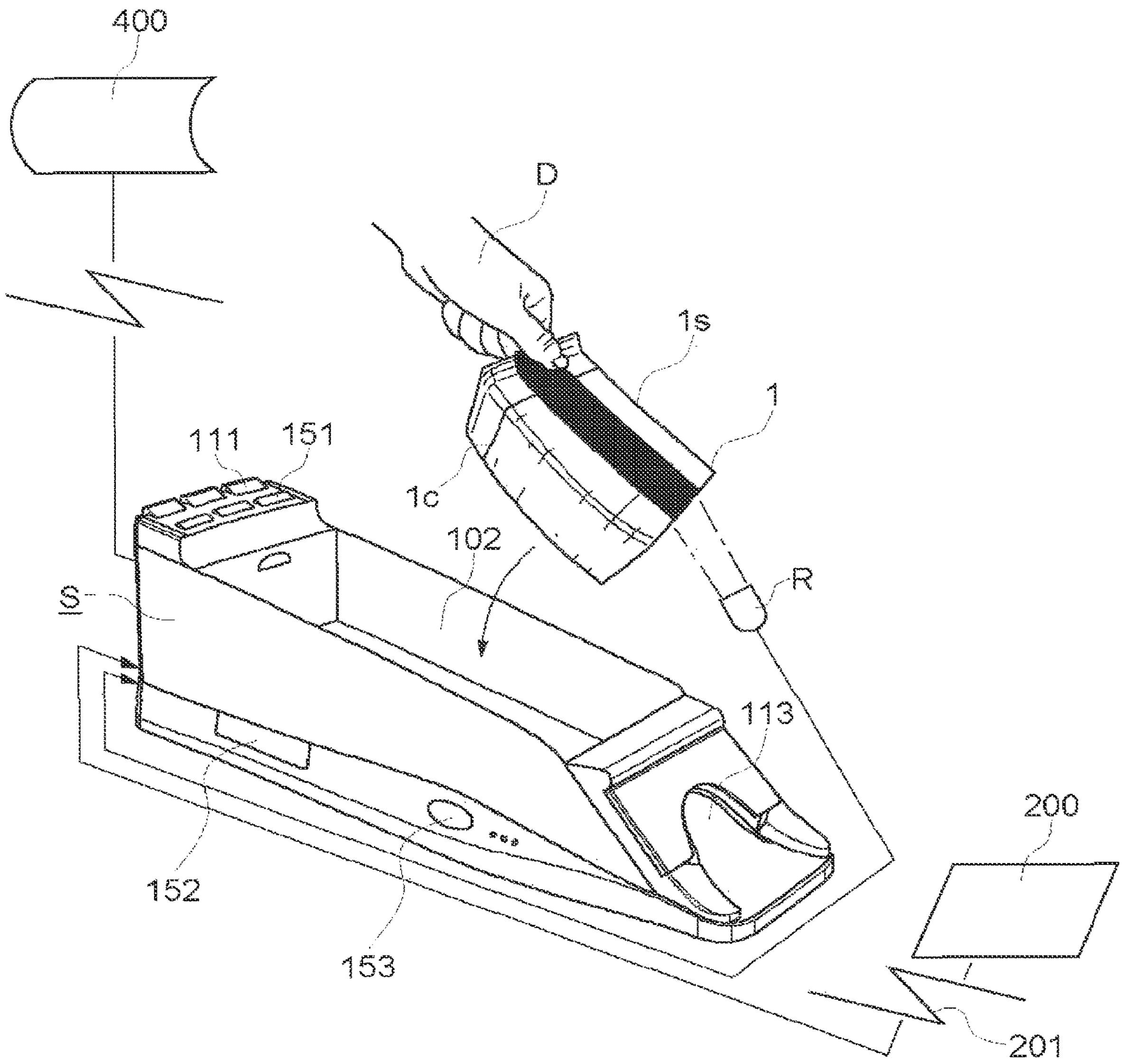
FIG. 5 is a perspective view schematically showing the entirety of a table game system.
Figure 6:
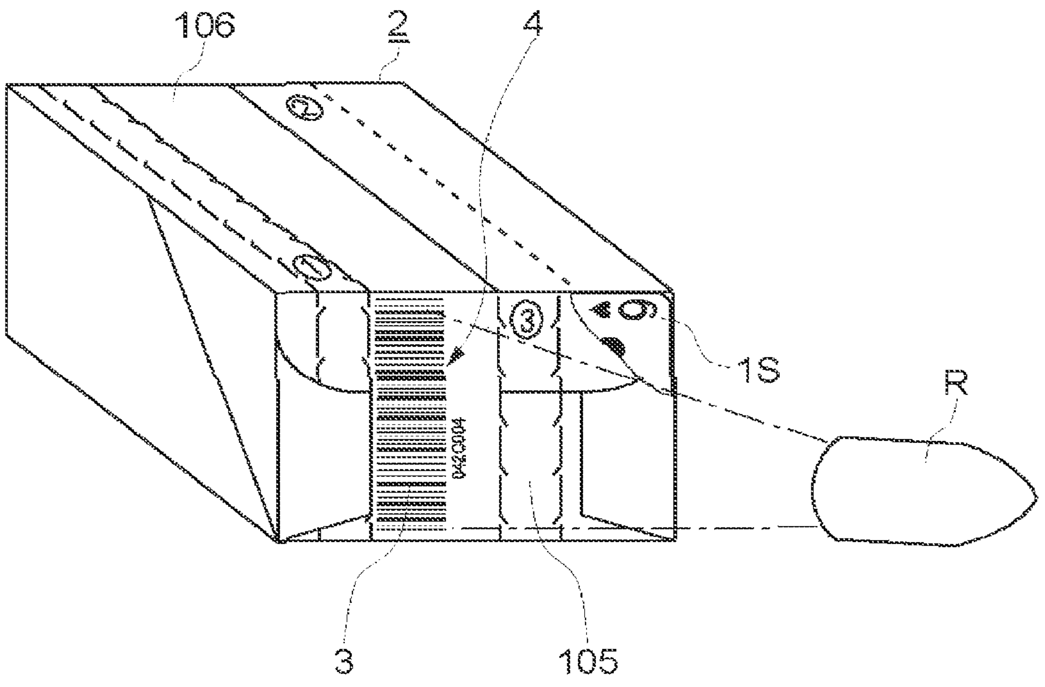
FIG. 6 is a perspective view of shuffled playing cards to be used in the table game system.

FIG. 5 is a perspective view schematically showing the entirety of a table game system. FIG. 6 is a perspective view of shuffled playing cards to be used in the table game system. Although a shuffled playing card set 1*s* is packed in the table game system of the present embodiment, when the shuffled playing card set 1*s* is to be used in the game, it is housed in a card shoe apparatus S after the packing is undone to enable the cards 1 of the shuffled playing card set 1*s* to be dealt one by one. During the game, the dealer deals the cards 1 from the card shoe apparatus S onto the game table. The cards 1 of each shuffled playing card set 1*s*, which made up of a predetermined number of decks (normally, 6, 8, 9 or 10 decks), are shuffled to be arranged in a unique and random arrangement order, and packed as a packing 2 with a barcode 3 (RFID or RF-tag can be used instead) as an ID code 4.

In an assembled state, a packing box 4 of the shuffled playing card set 1*s* has the shape of a rectangular parallelepiped, encasing the shuffled playing card set as shown in FIG. 2. The package 2 has zippers 105 provided in two locations at a predetermined interval, each of which has zipper-shaped cut lines arranged in parallel to a longitudinal direction of the rectangular parallelepiped shape, and has a central band 106 in the central portion defined by the zippers 105 provided in the two locations. A configuration is achieved in which by removing the two zippers 105 along the cut lines, the left and right side faces of the package 2 are removed such that the side faces of the shuffled playing card set 1*s* would be exposed (FIG. 5.)

A cut card 1*c* is inserted in the shuffled playing card set 1*s* before it is set in the card shoe apparatus S. The cut card 1*c* is inserted at any place within the latter half portion of the shuffled playing card set 1*s* when used in a game (in the last quarter or one-fifth of the shuffled playing card set 1*s*). The cut card 1*c* is used to end a game at the game table leaving about 20 to 40 cards 1 in the card shoe apparatus S to prevent any player or anyone from counting the ranks of the cards 1 dealt during a game to predict the ranks of the cards when the number of cards not yet dealt becomes small. Normally, when the cut card 1*s* is drawn during a game, use of the shuffled playing card set 1*s* currently in use is stopped after that game or a few games thereafter, and the game ends. The shuffled playing card set 1*s* in the card shoe apparatus S is replaced with a new set, and a new game begins.

Figure 7:
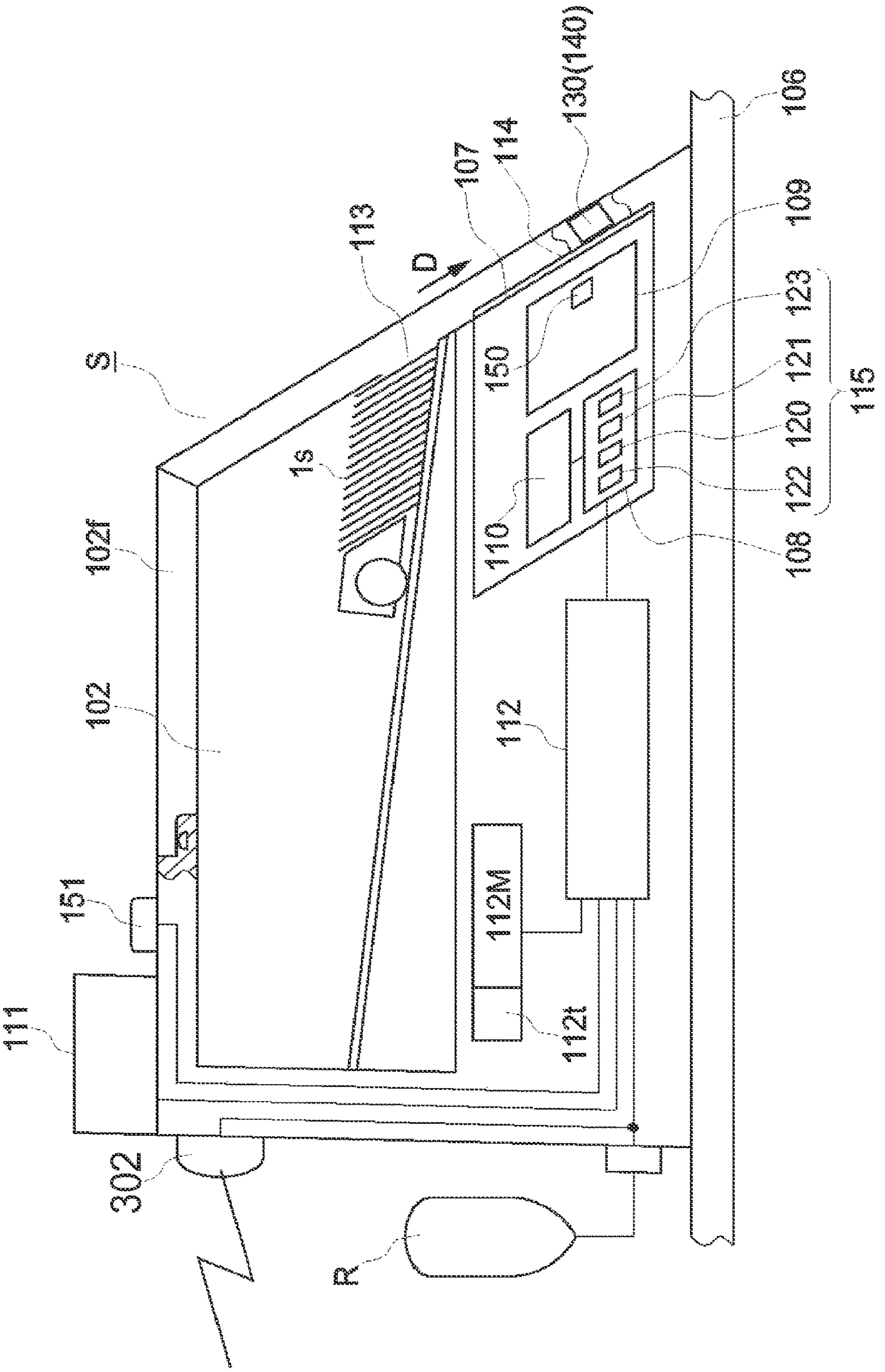
FIG. 7 is a diagram showing a general configuration of the card shoe apparatus.

In FIG. 7, the card shoe apparatus S of the table game system of the 2nd embodiment is provided with a lid 102*f* that enables the insertion and removal of the shuffled playing card set 1*s*. The card shoe apparatus S has a card guide unit 107 that guides cards 1 that are manually drawn one by one from a card housing unit 102 onto a game table, a code reading unit 108 that reads, when a card 1 is manually drawn from the card housing unit 102 by a dealer or the like of a casino, the code C that indicates a figure (number, rank) of that card 1, a winner/loser determination unit 110 that determines the winner/loser of the card game based on the numbers (ranks) of the cards 1 sequentially read by the code reading unit 108, and an output means 111 that outputs the result of the determination made by the winner/loser determination unit 110.

Figure 8:
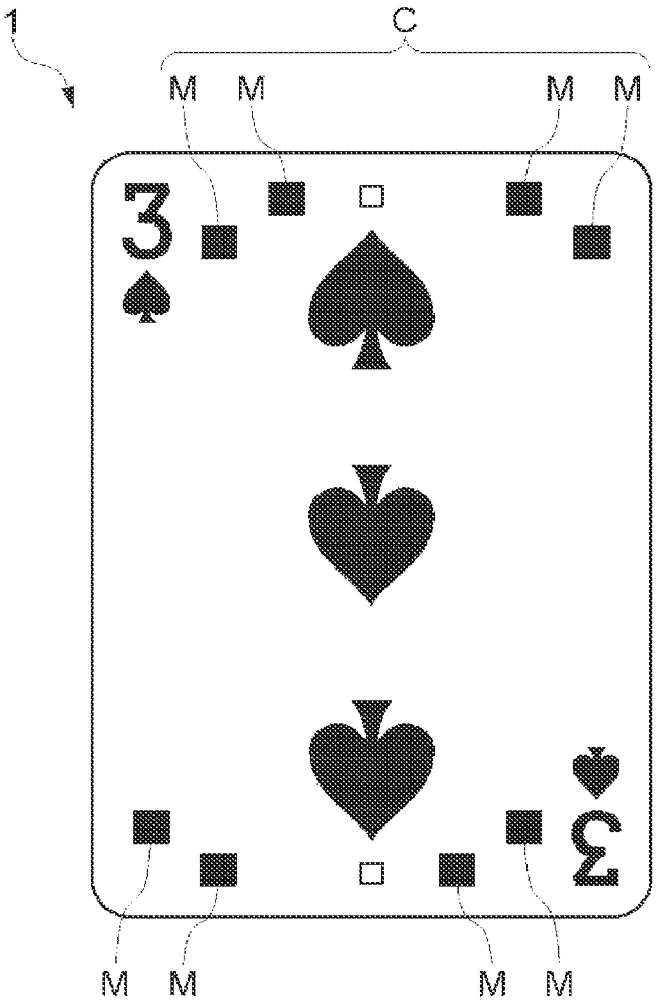
FIG. 8 is a plan view of a card.

FIG. 8 shows the cards 1 that form the shuffled playing card set 1*s*. A figure is encoded and printed on each card 1 that is used in a table game such as baccarat as a mark M in UV ink or the like, which is invisible under normal conditions. Codes C, each of which is configured with marks M, are provided in the upper and lower sides of the card 1 in a point-symmetric manner. Preferably, the code C is printed in a position where it does not overlap with the indications of the card types or indexes with a paint material that becomes visible when irradiated with a UV ray.

Figure 9:
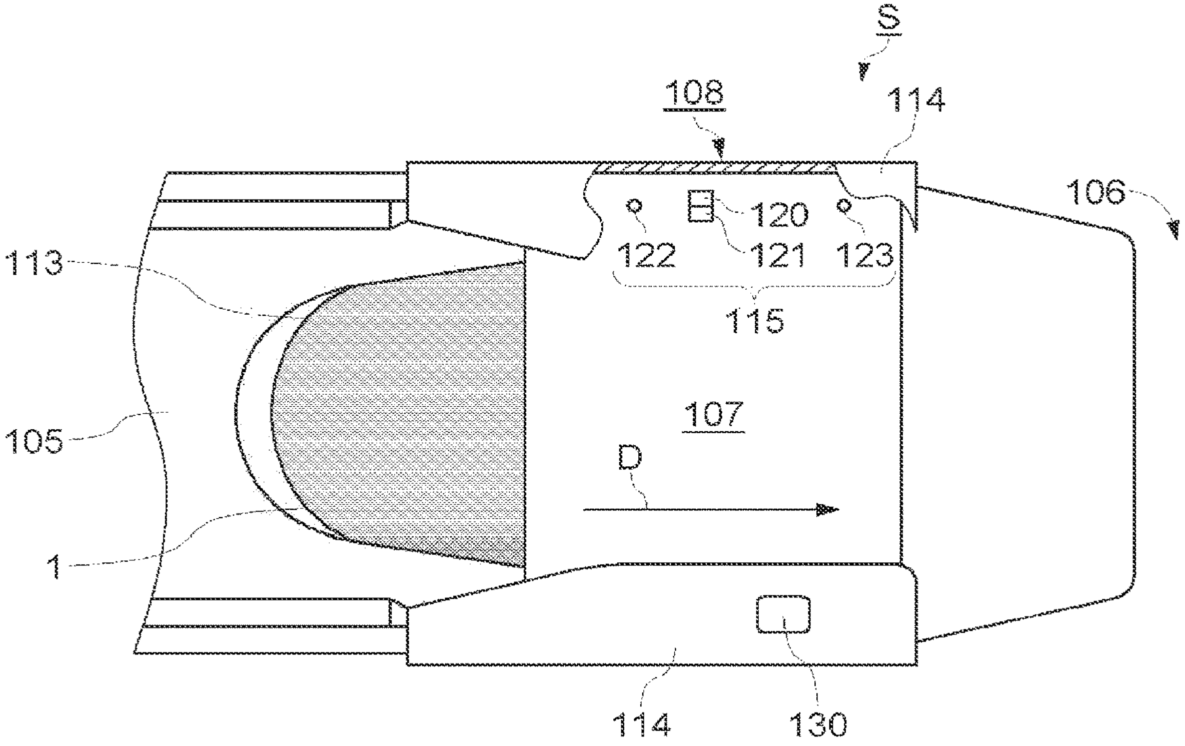
FIG. 9 is a plain view showing a main portion of a card guide of the card shoe apparatus, in which the card guide is partially broken.

Next, the code reading unit 108, which reads from a card 1 the code C that indicates the figure (number, rank) of the card 1 when the card 1 is manually drawn from the card housing unit 102, will be described in detail with reference to FIG. 9. FIG. 9 is a plain view of a main portion of the card shoe apparatus S. In FIG. 9, the code reading unit 108 is provided in the card guide unit 7 that guides the cards 1 manually drawn one by one from an opening 113 of the card housing unit 102 onto the game table 106, with the opening 113 provided in a front portion of the card housing unit 102. The card guide unit 107 is an inclined surface, and a card guide cover 114 is attached to a portion of the edge of each of both sides thereof, with the card guide cover 114 also serving as a sensor cover. Also, each of the two card guide covers 114 is configured to be attachable/detachable with screws or the like (not shown). When a card guide cover 114 is removed, a sensor group 115 of the code reading portion 108 is exposed. The sensor group 115 is composed of four sensors, including two ultraviolet reactive sensors (UV sensors) 120 and 121, and object detection sensors 122 and 123.

The object detection sensors 122 and 123 are optical fiber sensors that each can detect the presence of a card 1 and movement thereof. The object detection sensor 122 is placed in the upstream side of the card guide unit 107 in the direction of the flow (arrow D) of the card 1, and the object detection sensor 123 is placed in the downstream side of the card guide unit 107 in the direction of the flow of the card 1. As shown in FIG. 9, the object detection sensors 122 and 123 are provided in the upstream and downstream sides of the UV sensors 120 and 121, respectively. Each of the UV sensors 120 and 121 includes an LED (UV LED) that emits an ultraviolet ray and a detector. The marks M are printed on the card 1 in UV luminescent ink that emits color when UV ray is applied. The card 1 is irradiated with the UV ray (black light), and the detector detects the light reflected by the marks M of the code C of the card 1. The UV sensors 120 and 121 are connected to a control unit 112 of the code reading unit 108 via a cable. In the code reading unit 108, the arrangement patterns of the marks M are determined based on the output signals of the detectors of the UV sensors 120 and 121, and the number (rank) corresponding to the code C is also determined.

In the code reading unit 108, the start and end of the reading performed by the UV sensors 120 and 121 are controlled by the control unit 112 based on the detection signals from the object detection sensors 122 and 123. Also, the control unit 112 determines whether a card 1 has properly passed through the card guide unit 7 based on the detection signals from the object detection sensors 122 and 123. As shown in FIG. 8, the rectangular marks M are arranged within a framework of two rows with four columns on each of the upper and bottom edges of the card 1, and the arrangement of such marks M indicates the rank (number) and the suit (Heart, Spade or the like) of the card 1. If the UV sensor(s) 20 and/or 21 detect(s) a mark M, such UV sensor(s) will give out an on signal. The code reading unit 108 determines the relative relation between the signals received from the two UV sensors 20 and 21. This enables the code reading unit 108 to identify the code based on the relative difference or the like between the two marks M detected by the two UV sensors 120 and 121, thereby identifying the number (rank) and the type (suit) of the corresponding card 1.

Figure 10:
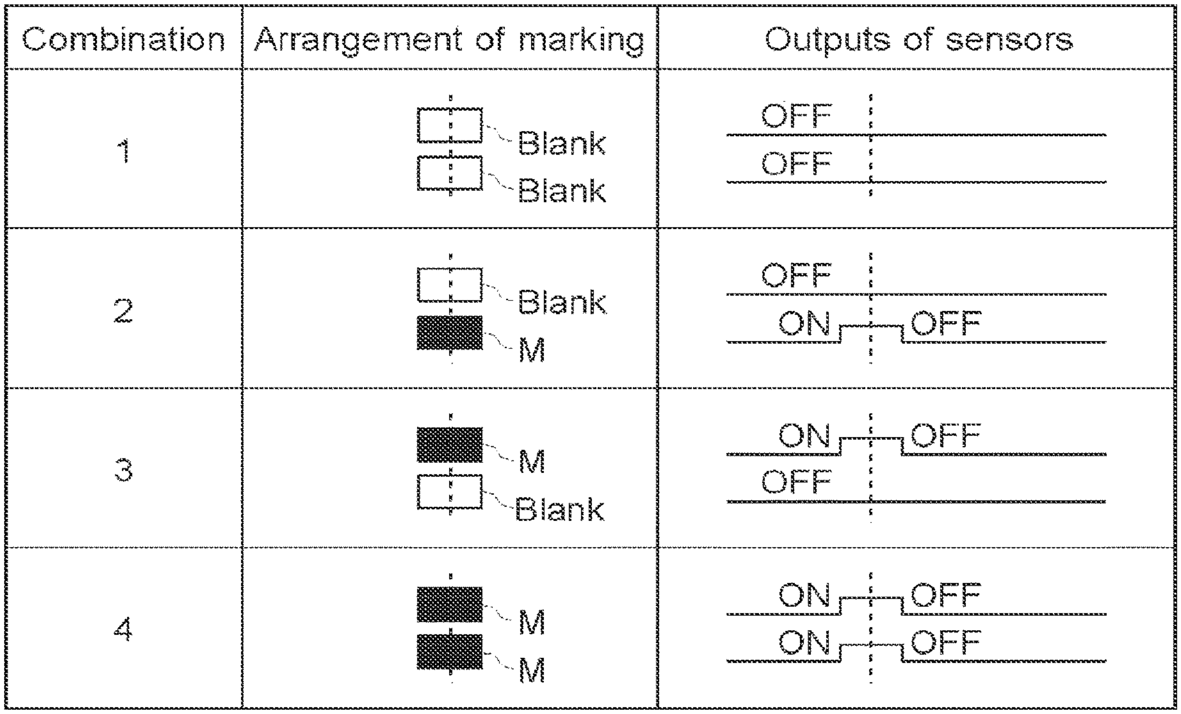
FIG. 10 is a diagram showing the relation between the output waves from sensors and marks in the card shoe apparatus.

The relation between the code C and the output of the on signals of the two UV sensors 120 and 121 are shown in FIG. 10. It is possible to identify a predetermined arrangement pattern of the marks M based on a comparison of the results of the relative changes in the output of the on signals of the UV sensors 120 and 121. As a result, in two rows (the upper and lower rows), four types of arrangement patterns of the mark M are possible, and since patterns are printed in four columns, it is possible to form 256 types of codes (4×4×4×4). Fifty two (52) different playing cards are each assigned to one of the 256 codes, and the associations of such assignments are stored in a memory or by a program as an association table. The card reading unit 108 can, by identifying the code C, identify the number (rank) and the type (suit) of the card 1 based on that predetermined association table (not shown). Also, 52 cards can be freely associated with 52 codes out of the 256 codes to be stored in the association table, and thus, there will be a variety of associations between them. Therefore, it is possible to change the associations among the 256 codes C and the suits and ranks of the 52 cards depending on the time or place. Preferably, the code C is printed in a position where it does not overlap with the indications of the card types or indexes with a paint material that becomes visible when irradiated with a UV ray.

Next, the control unit 112 will be described in further detail. The control unit 112 is achieved by a computer apparatus, and includes the winner/loser determination unit 110 that automatically determines the winner/loser of a game, and the like. This process function (in the control unit 112) is achieved by installing in a computer a program for determining the winner/loser, which is executed by a computer processor. Also, the control unit 112 reads from the barcode 3 (it may be 2-dimensional code like QR code) read by the barcode reader R the shuffled card ID, which uniquely identifies the shuffled playing card set 1*s*, and stores the shuffled card ID in a reading memory 112M. The control unit 112 reads the barcode 3 with the barcode reader 100, and stores the uniquely identifiable shuffled card ID. Then, the control unit 112 identifies the shuffled playing card set 1*s* that is currently being used in the game and the current time, and stores them in connection with the shuffled card ID. The control unit 112 causes each of the following specified events that occur while the shuffled playing card set 1*s* identified by the shuffle card ID is being used at the game table to be stored in the memory 112M in connection with the time of occurrence thereof. Also, the ordinal number of the card subject of the occurrence of the relevant event within the shuffled playing card set 1*s* currently set in the card shoe apparatus, or the ordinal number of the game subject of the occurrence of the relevant event among the individual games played with such shuffled playing cards (the winner (the player or the banker) is determined for each individual game, and after betting chips are settled, the next individual game starts) is stored.

The items of specified events to be stored in connection with the shuffled card ID include at least one of the following:

(1) a reading error in the cord reading unit 108 of a card in the identified shuffled playing card set;

2) an end of a game due to an operation of an end button 53 to end the use of the shuffled playing card set 1*s* currently set in the card shoe apparatus S, or the drawing of the cut card 1*c* from the shuffled playing card set 1*s* currently set in the card shoe apparatus S;

(3) an attempt to draw a card when no card should be drawn according to the rules of the card game;

(4) an attempt to move or insert a card in a direction opposite to a drawing direction of the opening 113; and (5) an occurrence of a preset irregular operation to be determined to be irregular by the card shoe apparatus S.

Note that the reading error in item (1) above refers to a failure by the cord reading unit 108 that reads two marks M of the card 1 to identify the card based on the association table due to the code that is read not being a predetermined code, or a failure to identify the number (rank) and the type (suit) of the card 1 that correspond to the code read. With respect to item (2) above, the end button 53 is pressed to end the use of the shuffled playing card set 1*s* currently set in the card shoe apparatus S. Upon this action, the end of a game is registered in the card shoe apparatus S. Also, if the cut card 1*c* is drawn from the shuffled playing card set 1*s* currently housed in the card shoe apparatus S, the game ends at the next game or after a few games, and the remaining cards of the shuffled playing card set 1*s* will not be used anymore. An attempt to draw any card when no card should be drawn according to the rules of the card game as described in item (3) above will be described later. Any attempt to insert any card in the opposite direction at the opening 113 as described in item (4) above refers to a case where the object detection sensors 122 and 123 detect a fraudulent act such as the insertion of any card in the direction opposite to the direction of the movement of a card 1 (arrow D) under the relevant conditions, and assumes a case where the object detection sensors 122 and 123 detect movement of a card 1 in the direction opposite to the arrow D. Any preset irregular situation that will be determined by the card shoe apparatus S as irregular as described in item (5) above refers to, for example, a situation where the card 1 stays above the object detection sensors 122 and 123 for a period longer than the predetermined period, and such irregular situation has been input and stored in advance in the memory 112M as a program.

The memory 112M stores the occurrence of any security item in connection with the relevant shuffled card ID read by the barcode 3, and when it stores a security item, it stores the time of occurrence of that security item as well. For this purpose, the memory 112M includes a clock 112*t*. It also includes an external transmission apparatus 302 for externally transmitting the occurrence of a security item with the shuffled card ID. Notice of the occurrence of a security item and the time of its occurrence is given to the management division or the pit of the casino via the external transmission apparatus 302 in connection with the relevant shuffled card ID. The management division of the casino stores and registers such transmitted items in connection with the relevant shuffled card IDs in a database 400. The dealer or the like is also informed about the occurrence of a security item by the display made by lamps 151 and a liquid crystal display unit 152.

Next, a variation in which an input means 200 is provided instead of the barcode reader R that is capable of identifying the shuffled card ID will be described. Instead of reading the barcode 3 with the barcode reader R to identify the shuffled card ID of the card set currently being used, a configuration is possible in which a barcode reader is provided in a separate device installed on the game table (for example, an apparatus for the disposal of a card 1 or a device that confirms the card 1 disposed), and the shuffled card ID [ID code 4 of the card set] to be used is obtained by such a barcode reader, and the shuffled card ID [ID code 4] is input to the card shoe apparatus S through communication 201 with such a device. In this case, the separate device with the barcode reader serves as an input apparatus capable of identifying the shuffled card ID [ID code 4].

Figure 11A:
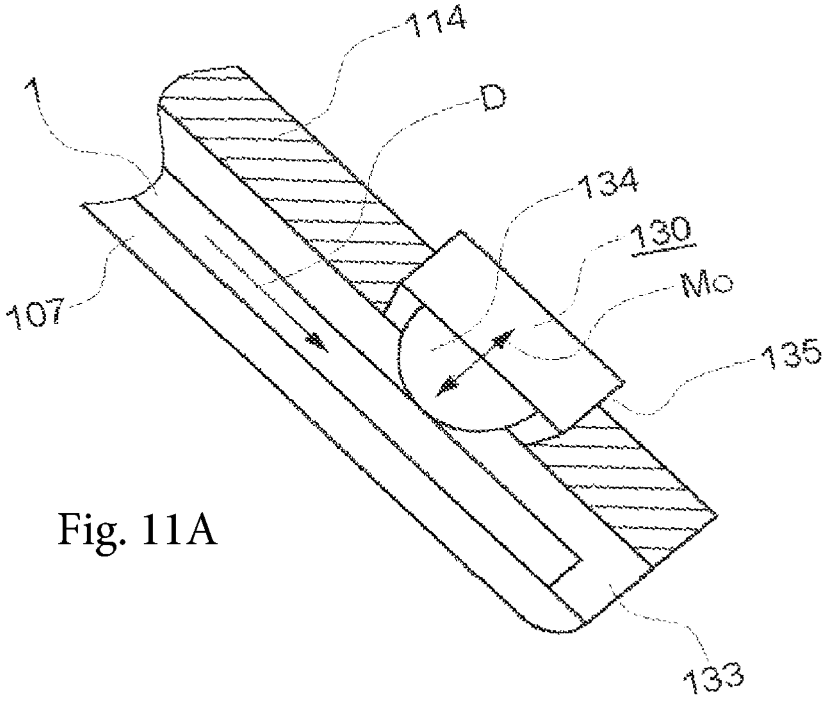
FIG. 11A is an enlarged cross-sectional view of a card entry/exit restriction means that restricts the entry/exit of cards from a card housing unit of the card shoe apparatus.

Next, a card entry/exit restriction means 130 that restricts the entry/exit of a card 1 to/from the card housing unit 102 will be described with reference to FIG. 11. The card guide unit 107 is provided with the card entry/exit restriction means 130 to restrict the entry/exit of a card 1 via the card housing unit 102. In FIG. 11A, the card entry/exit restriction means 130 is provided in the card guide cover 114 of the card guide unit 107 that guides the cards 1 drawn one by one onto the game table from the opening 113, which is provided in a front portion of the card housing unit 102. The card entry/exit restriction means 130 has a structure by which when a card 1 passes through a slot 133 between the card guide unit 107 and the card guide cover 114, a lock member 134 presses the card 1 to block its entry/exit within the slot 133. The lock member 134 is capable of moving in the direction indicated by the arrow Mo by a driving unit 135 composed of an electromagnetic solenoid, a piezoelectric device or the like, such that it can take two positions, namely, a position pressing the card 1 (restricted position) and a position allowing the card 1 to pass through. The driving unit 135 is controlled by the control apparatus 112, and moves the lock member 134 to two positions, namely, a position pressing the card 1 and a position allowing the card 1 to pass through. The rules of the baccarat game are programmed and stored in advance in the control apparatus 112.

Figure 11B:
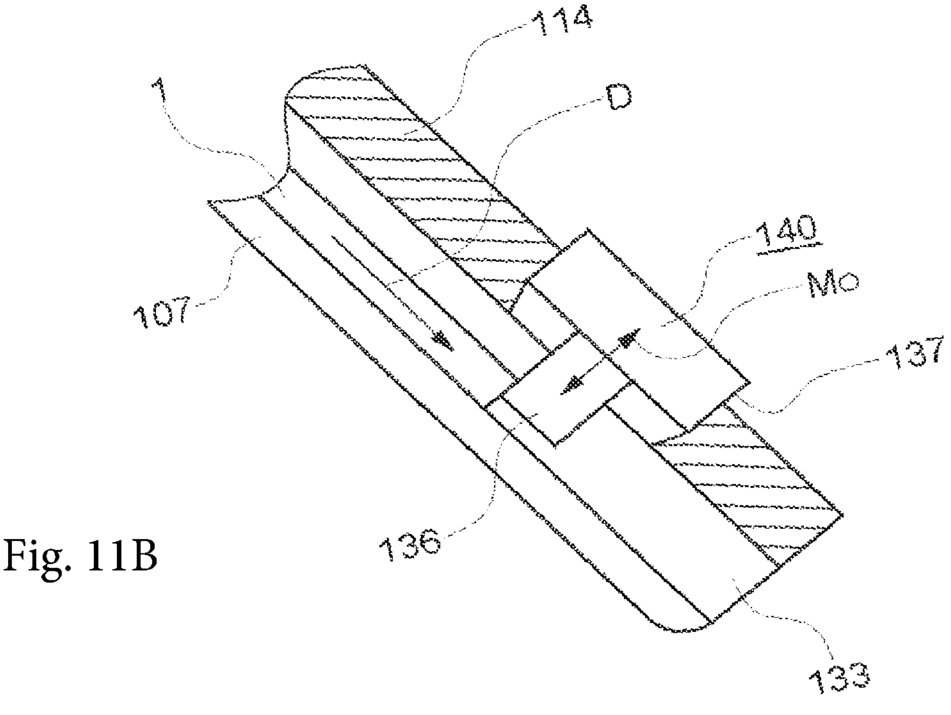
FIG. 11B is an enlarged cross-sectional view of a variation of the card entry/exit restriction means.

Next, a variation of the card entry/exit restriction means 130 will be described with reference to FIG. 11B. A card entry/exit restriction means 140 of the variation has a structure by which when a card 1 passes through the slot 133 between the card guide unit 107 and the card guide cover 114, a lock member 136 protrudes into the slot 133 to block movement of the card 1. The lock member 136 is capable of moving in the direction indicated by the arrow Mo by a driving unit 137 composed of an electromagnetic solenoid, a piezoelectric device or the like, such that it can take two positions, namely, a position blocking movement of the card 1 (restricted position) and a position allowing the card 1 to pass through. The driving unit 137 is controlled by the control apparatus 112, and moves the lock member 136 to two positions, namely, a position blocking movement of the card 1 and a position allowing the card 1 to pass through.

The card entry/exit restriction means 130 (140) is caused to function by the driving unit 135 or 137 being controlled by a program of the control apparatus 112 to prevent the fraudulent entry/exit of a card 1. The card entry/exit restriction means 130 (140) is provided with the object detection sensors 1122 and 23 as sensors to detect movement of the card 1, and has a function of detecting movement of a card 1 with these sensors 122 and 123 to restrict such movement. The details of the contents (programmed contents) performed to prevent the fraudulent entry/exit of a card 1 includes at least one of the following:

1) A function of blocking the insertion of a card 1 inserted or moved in a direction opposite to the direction of the arrow D, namely, from the exterior toward the card housing unit 102 via the opening 113. In this case, although the card 1 inserted for the purpose of cheating passes through the slot 133 between the card guide unit 107 and the card guide cover 114, the movement of the card 1 in a direction opposite to the normal direction (the direction opposite to the arrow D in FIG. 9) is detected based on the detection signals from the object detection sensors 122 and 123, and due to the program of the control apparatus 112, the driving units 135 and 137 will move their corresponding lock members 134 and 136 to their respective positions of pressing or blocking the card 1. In this case, the control unit 112 determines that the situation falls under the security item (4), namely, an attempt to move or insert a card in an opposite direction through the opening.

2) A function of blocking the drawing of a card 1 from the card housing unit 102 when such drawing should not be allowed based on the information on the suits and the ranks of the cards 1 read by a card reading unit (this means the code reading unit 108 that reads from a card 1 the code C that indicates a figure (number, rank) of that card 1 when the card 1 is drawn from the card housing unit 102). In this case, as described above, the rules of the baccarat game are programmed in advance in the control apparatus 112. In the baccarat game, whether each of the banker and the player should draw two or more cards 1 is uniquely determined according to the total of the ranks (numbers) of the two cards already dealt to each of them. Thus, if the dealer of a table attempts to deal a card 1 in a case where the third card should not be drawn, which is against the rules, movement of the card 1 is restricted. If the card 1 is attempted to be drawn at a time or state when such drawing should not be allowed, movement of the card 1 is detected based on a signal given by the object detection sensor 122 regarding the detection of the card 1, and the driving units 135 and 137 will move their corresponding lock members 134 and 136 to their respective positions of pressing or blocking the card 1 due to the program of the control unit 112. Then, the lock members 134 and 136 will move to their respective positions of pressing or blocking the card 1, and the dealing of an additional card 1 is blocked (the positions shown in FIG. 11). In this case, the control unit 112 determines that the situation falls under the security item 3, namely, an attempt to draw a card when no card should be drawn according to the rules of the card game. This corresponds to item (3) of the above-described specified events to be stored in connection with a shuffled card ID. That is, with respect to the above-mentioned item (3), the occurrence of an attempt to draw a card when no card should be drawn according to the rules of the card game is registered in the control unit 112.

For each shuffled card ID of the shuffled playing card set 1*s*, when an event falling under any of the specified events (security items) occurs thereto, the management division or the pit of the casino is informed via an external transmission apparatus 302 of the fact and the time of said occurrence in connection with the relevant shuffled card ID, and such information is forwarded to the database 400 and stored therein. Furthermore, the dealer or the like is informed of the occurrence of a security item by the display made by the lamps 151 and the liquid crystal display unit 152. Such transmitted items are registered in the database 400 of the management division of the casino so that an item that falls under at least one of the following is registered in connection with the shuffled card ID identified with respect to the card set currently used in the game, thereby providing overall control of the operations of the casino or an efficient operation thereof.

For the overall control of the operations of the casino or the efficient operation thereof, the management division of the casino register in the database and use, for example, the data items described below:

(1) the game table used;
(2) the dealer (person who draws the cards) in charge of the game table used;
(3) the start time of the use of the identified shuffled playing card set;
(4) the end time of the use of the identified shuffled playing card set;
(5) the time period when the card(s) of the identified shuffled playing card set were present on the game table;
(6) information concerning the pit or the card room where the identified shuffled playing card set is managed before it is delivered to the relevant game table;
(7) information concerning the process of disposal of the identified shuffled playing card set after its use at the game table;
(8) information on whether all of the cards of the identified shuffled playing card set have reached the disposal apparatus;
(9) information concerning the pit or the card room where the shuffled playing card set identified in advance is managed before it is delivered to the relevant game table;
(10) information concerning the win and the loss at the game table where the identified shuffled playing card set is used;
(11) the time period after the end of the game played using the identified shuffled playing card set and until the start of the next game with the new shuffled playing card set;
(12) the time period from the start to the end of the game played using the identified shuffled playing card set; and
(13) information on the purchase or procurement of the identified shuffled playing card set.

Figure 12:
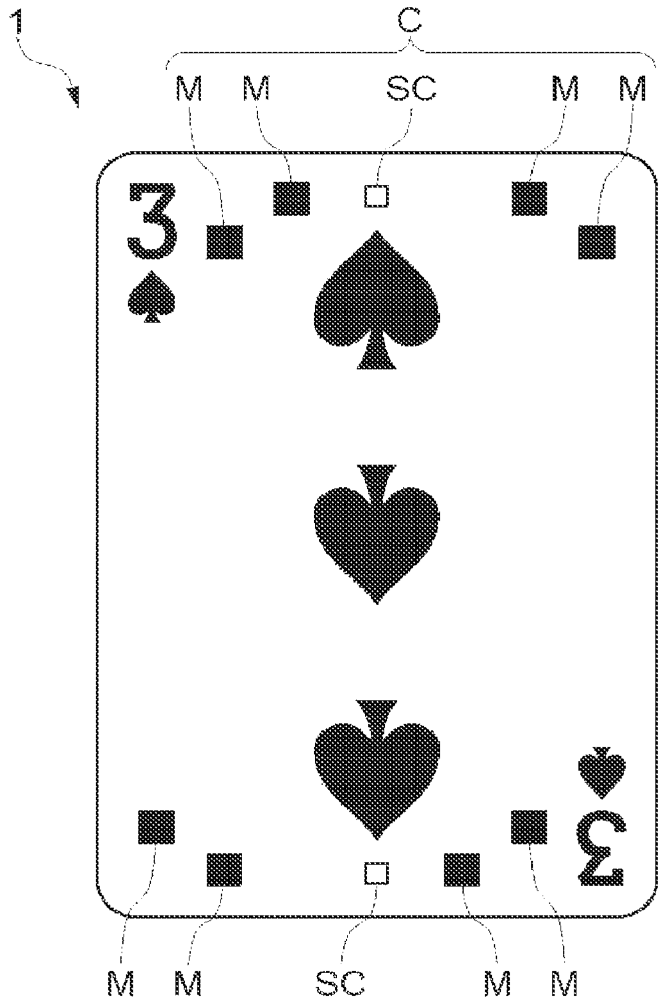
FIG. 12 is a plan view of a card.
Figure 13:
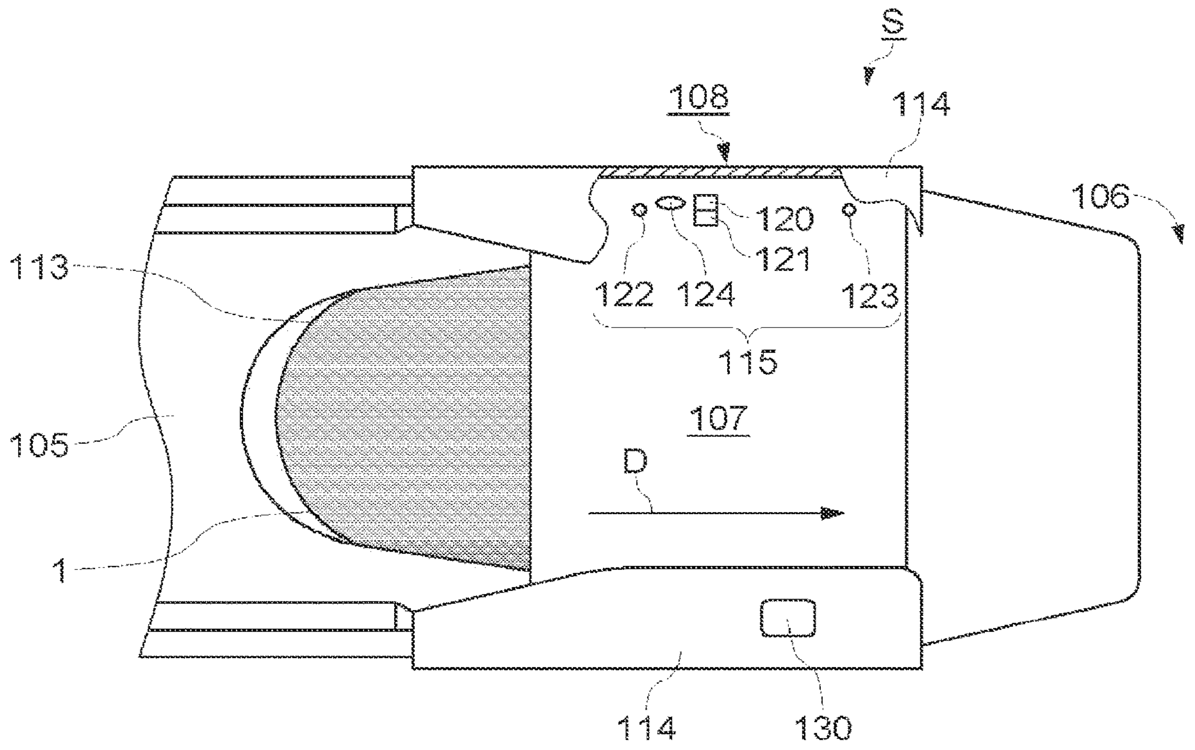
FIG. 13 is an enlarged plan view showing a main portion of a card guide of the card shoe apparatus, in which the card guide is partially broken.
Figure 14:
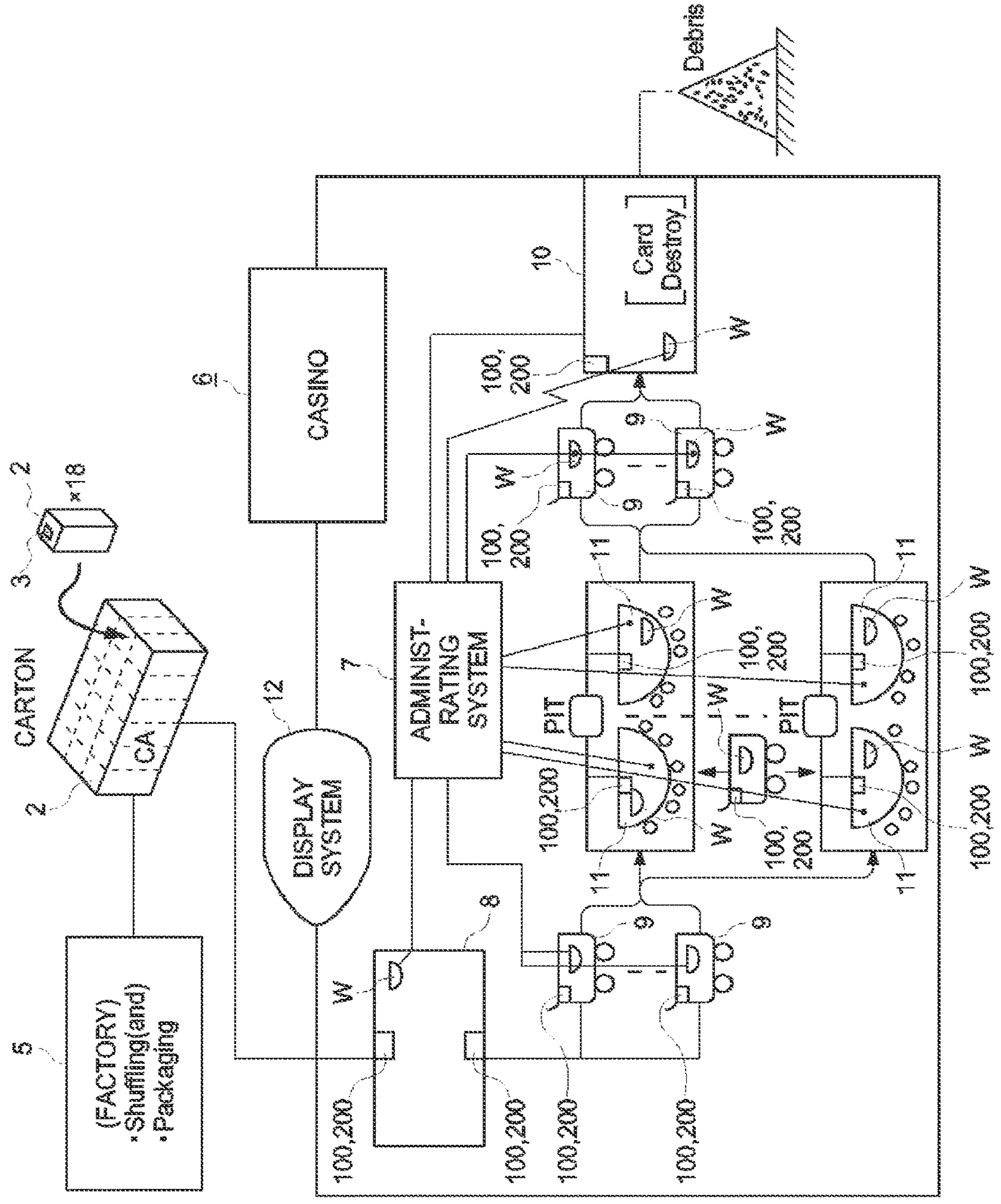
FIG. 14 is a diagram schematically showing the entirety of a table game system.
Figure 15:
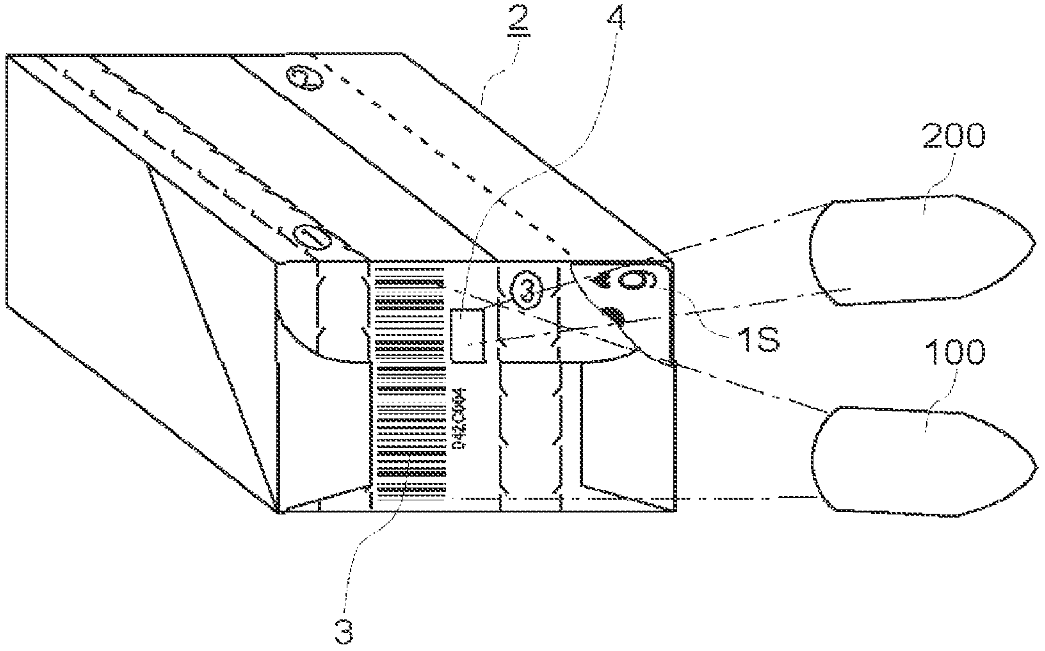
FIG. 15 is a perspective view of shuffled playing cards to be used in the table game system.

The group code SC will be described in further detail. As shown in FIG. 12, the card 1 is provided with a group code SC that is configured by encoding information that represents the group of the card and is invisible under normal conditions (for example, UV ink). This group code SC is provided in the same position in at least the cards of the same set. The group code SC is a substance or material itself that emits, as a code, light rays of different wavelength spectra when irradiated with light rays of different wavelengths, and is configured such that light rays of different wavelengths are emitted when irradiated with light rays of different wavelengths. Whether the group code SC identified and the group code SC read by the code reading unit 8 matches or not is determined by the control unit 112, depending on whether or not the predetermined wavelength of light ray and that of the read group code SC match. At the start of the game, the shuffled card ID of the shuffled playing card set 1*s* that is housed in the card shoe apparatus S to be used is identified by reading the barcode 3 (as the ID code 4) with the barcode reader 100. The shuffled card ID and the group code SC are associated with each other such that if the shuffled playing card set 1*s* to be used is identified, the group code SC attached to such shuffled playing card set 1*s* is identified based on the shuffled card ID. Whether or not the group code SC identified by the control unit 112 of the card shoe apparatus S matches the group code SC read by the code reading unit 108 is determined when the group code SC attached to the card 1 used is actually read. Thus, it is impossible to know how the group code SC is determined from the outside.

A polymer material that has a molecular structure with which a light ray of a specific wavelength is emitted against light is printed in the upper and lower edges of the card 1 as shown in FIG. 12, as the group code SC. The group code SC cannot be recognized by human eyes under normal use conditions (daylight, natural light, or the like). The group code SC is read by the UV sensor 124. The group code SC is read by the UV sensor 124 provided in the card guide 7 when the card 1 is guided by the card guide unit 107 as it is slid through it. Also, the group code SC may be mixed with an infrared or ultraviolet responsive ink for printing the code C, which is used for identifying the number (rank) of the card 1, as printed. Each group code SC within the infrared or ultraviolet responsive ink cannot be recognized by human eyes under normal use conditions (daylight, natural light, or the like). The light source for reading the group code SC is integrally provided with the UV sensor 124. In this embodiment, LEDs that emit ultraviolet rays of two different wavelengths (UV LEDs) are used as sources of light (not shown).

The group code SC is printed independently and in the same position at least for the same set, as described above. However, a configuration is also possible in which the group code SC is configured using a certain substance or material that serves as a code, and such substance or material is contained in the coating material, anchor coating material, or in the ink to print the back pattern, mark, index, or the code to indicate the number of the mark on the surface of the card. As a variation of the present embodiments, the group code may be printed on the card 1 in a similar manner to that of the mark M or the barcode 3. The group information, which indicates the group of the group code, may be different for each deck or for each plurality of decks of cards 1. The group information may be differentiated for each casino or table where the cards are used, or for any other unit. The group information may be different for each card supply source (card shoe or the like). In addition, a different group code may be set for each manufacturing lot, or each casino that uses the cards.

Combinations described below are within various embodiments discussed herein.

A system for administrating a package of shuffled game cards, wherein a predetermined number of decks of game cards are shuffled in a random order and individually packaged as one package, a unique ID code is attached to the package of each unique shuffled game card, the system having:

an ID code reader disposed at the game table for obtaining the ID code of the packages at the game table to identify the package which will be the next use for a card dealing shoe, and an administrating controller for monitoring the ID code of package of shuffled game cards, wherein, the ID code of the package for the next use is examined whether it is the one properly arrived on the game table or the one arrived at proper timing or period of time by the administrating controller, and at least one of the following items is stored in a memory or database in connection with the shuffled card ID or ID code of the package of shuffled game cards in relation to the card set currently used in the card dealing shoe in a game:

(1) the game table used;

(2) the dealer (person who draws cards) in charge of the game table used;

(3) the start time of the use of the identified shuffled playing cards;

(4) the end time of the use of the identified shuffled playing cards;

(5) the time period when the identified shuffled playing cards were present on the game table;

(6) information concerning the pit or the card room where the identified shuffled playing cards are managed before it is delivered to the relevant game table;

(7) information concerning the process of disposal of the identified shuffled playing cards after its use at the game table;

(8) information on whether all of the identified shuffled playing cards have reached a disposal apparatus;

(9) information concerning the pit or the card room where the shuffled playing cards identified in advance is managed before it is delivered to the relevant game table;

(10) information concerning the win and lose at the game table where the identified shuffled playing cards are used;

(11) the time period after the end of the game played using the identified shuffled playing cards and until the start of the next game with the new shuffled playing cards;

(12) the time period from the start to the end of the game played using the identified shuffled playing cards; and

(13) information on the purchase or procurement of the identified shuffled playing cards.

A card dealing shoe with an ID code reader for a system for administrating a package of shuffled game cards, a predetermined number of decks of game cards are shuffled in a random order and individually packaged as the package for the system, a unique ID code is attached to the package of each unique shuffled game card, wherein the card dealing shoe on a game table is connectable to an administrating controller for the packages, wherein, the ID codes of the packages being read for the next use is examined whether it is the one properly arrived on the game table or the one arrived at proper timing or period of time by the administrating controller.

A package of shuffled game cards for administrating, wherein a predetermined number of decks of game cards are shuffled in a random order and individually packaged as the package, a unique ID code is attached to the package of each unique shuffled game card, the ID code is for being read at the game table when the package is selected for the next use of a card dealing shoe at the game table by a ID code reader, and the ID codes of the packages read by the ID code reader is for being examined administrating system whether it is the one properly arrived on the game table or the one arrived at proper timing or period of time.

The ID code reader may be selected from at least a barcode reader (it may be 2-dimensional code reader like QR code reader), a camera or RFID tag reading means.

An embodiment of a system for administrating a package of shuffled playing cards according to an administrating method will be described below. FIG. 1 is a perspective view schematically showing the entirety of a system for administrating a package of shuffled playing cards in a random order in casinos according to an embodiment. FIG. 2 is a perspective view of a package of shuffled playing cards to be used in table games in casinos according to the embodiment. Although a shuffled playing cards 1*s* is packaged as a package 2 in the present embodiment, when the shuffled playing cards 1*s* is to be used in the game on the table, it is housed in a card shoe apparatus after the package is undone to enable the cards of the shuffled playing cards 1*s* to be dealt one by one. During the game, the dealer deals the cards from the card shoe apparatus onto a game table. The cards of each shuffled playing cards 1*s*, which made up of a predetermined number of decks (normally, 6, 8, 9 or 10 decks), are shuffled in a random order to be arranged in a unique and random arrangement order, and packaged with a uniquely identifiable shuffled card ID attached to the package 2 as a barcode 3 for a barcode reader 100. A RFID 4 (or a RF-tag) may be attached as the ID code instead of or together with the barcode 3.

The term 'RFID' as used herein refers to a Radio Frequency Identification for a RFID reading device 200. The shuffled deck of playing cards 1*s* is shuffled by a card shuffling device (not shown) in advance in order for them to be arranged in a random order, and packaged as package 2 that encases the shuffled decks of playing cards 1*s*, sealed with a sealing material or a shrink packaging material in a factory 5 and then supplied to casinos 6 by cartons CA which are containing 18 packages of shuffled playing cards 1*s*.

The administrating system 7 in casinos 6 is used to administrate whether or not any lost package exist. During lost or missing of packages one may make cards mix or exchanged in the package 2 with falls cards preliminary arranged in a certain sequence to control or win the game on the table. To solve the above problems, the present administrating system 7 provides a method for administrating a package of shuffled playing cards.

The packages 2 with barcodes 3 attached as unique ID codes are supplied to a backyard 8 of casino 6 by cartons CA which are containing 18 (eighteen) packages of shuffled playing cards 1*s*. The packages 2 with barcode 3 are carried by using plural carriers 9 from the backyard 8 to a disposition place 10 through at least one of the places of playing tables 11 to be used for game plays.

The administrating system 7 will be described in further detail. The administrating system 7 is achieved by a computer apparatus and methods or process functions are achieved by installing in a computer with a program which is executed by a computer processor. The administrating system 7 performs the administrating methods as follows:

1) All of ID codes of the packages 2 which have been brought into the backyard 8 are registered to memories of administrating system 7 (as a registering step for registering to a data base).
2) Then some of the packages 2 of shuffled playing cards at the places of the backyard 8 are loaded on each one of carriers 9 for deliveries in the casino 6 (as a loading step for loading some of the packages 2 of shuffled playing cards at the places of the backyard 8). At this loading step every ID codes of the packages 2 which are loaded on each one of carriers 9 are read by barcode reader 100 and these ID codes as a loaded ID code are reported by wireless devices 300 of the carriers 9 to the administrating system 7.
3) Carriers 9 carry the packages 2 from the backyard 8 to one of the places of playing tables 11 through predetermined delivery route or from tables 11 to tables 11 (as a carrying step).
4) The packages 2 of shuffled playing cards loaded on carriers 9 are unloaded at a predetermined table 11 to be used for the games on each table (as an unloading step). Every ID codes of the packages 2 of shuffled playing cards (the barcodes 3 be read by barcode reader 100) are read when the packages 2 are unloaded together with the unloaded place (unloaded place of table 11) from the carrier 9 and these ID codes are reported by wireless devices of the carriers 9 to the administrating system 7. The administrating system 7 has a further checking step for checking whether or not the same package 2 is unloaded at one of the places of playing tables 11 for twice uses.
5) The packages 2 of shuffled playing cards unloaded at a predetermined table 11 are used for the games (like Baccarat game) on each table 11 and the cards after used at the games are loaded on carriers 9 together with its barcode 3 for caring these used cards with ID codes to the disposition place 10 (as another loading step). Each carrying paths of all carries 9 for carrying the packages 2 from the backyard 8 to one of the places of playing tables 11 are being preliminary fixed (programmed) and monitored during the carrying step.
6) Carriers 9 carry the packages 2 of the playing cards together with its barcode 3 after used in the games from the places of tables 11 to the disposition place 10 (as other carrying step).
7) The packages 2 of shuffled playing cards from the place of tabled 11 on carriers 9 are unloaded at the disposition place 10 to be destroyed for not being able to be used for the new games (as an unloading step). Every ID codes of the packages 2 of shuffled playing cards are read by its barcode 3 when the packages 2 are unloaded at the disposition place 10 and these ID codes are reported by wireless devices of the carriers 9 or other to the administrating system 7.

When the barcode 3 is destroyed with being read by barcode reader 100, the ID code is registered as a destroyed ID code and the ID code of the destroyed ID is deleted from the registered ID code of the packages of shuffled playing cards. This step is for being able to check all of destroyed ID codes by comparing with all of ID code which will be brought into the backyard 8 as a new package. This step is for being able to check further whether or not all of the registered ID codes of the packages 2 of shuffled playing cards have been deleted for the results of used cards after the play of the games during an appropriate period of day or days. If one of the ID of the package had been undeleted this means there is inappropriate stock in somewhere in casino.

When ID codes of the packages 2 are to be read the barcode 3 is read by barcode reader 100. Carriers 9 may carry packages 2 from tables 11 to tables 11 (as a carrying step) as predetermined delivery route. The administrating system 7 is programmed to calculate places and a number of all packages 2 of shuffled playing cards as calculating step at each places of the backyard 8, the places of playing tables 11, places of carriers 9 and the disposition place 10 by using information obtained by the loading step and unloading step. The administrating system 7 calculates with every ID codes bases of places of all packages registered by the registering step for registering to a data base of administrating system 7 and each number of packages at each places by place basis from the information obtained from both the loading step and the unloading step. In this case the place means each the backyard 8, places of carriers 9, the disposition place 10 and the places of playing tables 11.

The calculation of places and a number of all packages 2 is proceeded with, for example, the following steps:

1) The calculated number=all number of ID codes of the packages 2 which have been brought (unloaded) into the backyard 8 and registered−(minuses) all number of ID codes of the packages 2 which have been loaded to all carriers 9 at the backyard 8 (ex. at the backyard 8).
2) These calculations 1) are proceeded with at every places (the backyard 8, the places of playing tables 11, all carriers 9 place by place bases and the disposition place 10).
3) Calculating and registering each the calculated numbers of ID codes at each place at place by place basis for all the places. ID codes which are thought to exist at each place are also registered with its place of all.
4) Summing up each calculated numbers of ID codes of all places (the backyard 8, the places of playing tables 11, carriers 9 and the disposition place 10).
5) Comparing total number of ID codes summed up at summing up step with all number of ID codes of the packages 2 which have been brought into the backyard 8 and registered.
6) Reporting about ID codes and number of the lost packages which has (have) been recognized and of its place(s) at which the lost package had been lost wherein the carriers 9 have an alarm for expressing an emergency when the package has been found lost during the carrying step. Every report with lost ID code or monitored results numbers etc., may be displayed by monitor display at administrating section etc.

At these steps for administrating a package of shuffled playing cards, each carrying paths of all carries 9 for carrying the packages 2 from the backyard 8 to the disposition place 10 are being monitored. Each carrying paths of all carries 9 for carrying the packages 2 from the backyard 8 to one of the places of playing tables 11 or further to the disposition place 10 are being preliminary fixed and monitored in the carrying step by administrating system 7. The places of carriers 9 are determined by sensors (not shown) set at the exit and entrance of each backyard 8, disposition place 10 and the places of playing tables 11 for monitoring. The places of carriers 9 may be also determined by sensors (not shown) set at certain positions on the predetermined delivery routes.

The administrating system 7 is further programmed to recognize whether or not there is a lost package by comparing the information of all ID cords registered in registering step with the ID cords at each every places of all packages obtained at the calculating step from both the loading step and the unloading step and reporting about the lost package to an administrating section or to a main administration organization.

The administrating system 7 is programmed to monitor each of the ID codes by reading ID codes of the actual packages of shuffled playing cards which exist at the places of playing tables 11 and the places of each carrier 9 of plural carriers 9 at predetermined timing (in every one hour or 3 seconds etc.) by reading device 100 (barcode reader 100) equipped at every tables 11 and at each carrier 9 of plural carriers 9. The administrating system 7 is programmed to recognize the lost ID code at each place of playing tables 11 or at places of each carrier 9 of plural carriers 9 by comparing all of existing actual ID codes at the places thereof with the calculated numbers of ID codes at each place obtained at step 3) (calculating and registering each calculated numbers of ID codes at each place by place basis for all the places from the information obtained from the calculating steps and the loading and unloading steps.

The each carrier 9 has an alarm for expressing an emergency when the package 2 is lost during the carrying step. At the registering step the administrating system 7 is programmed to further check all of destroyed ID codes by comparing with all of ID code of ID codes which have been brought into a backyard as new package. There is a displaying system 12 to display the ID codes of all of the packages as well as the lost package and the places where the packages exist and is lost.

The administrating system 7 is programmed to further administrate each carrying path of all carries 9 for carrying the packages 2 from the backyard 8 to one of the places of playing tables 11 or disposition place 10 are being monitored.

The administrating system 7 is further programmed to proceed with these further steps:

a reading step for reading all of the ID codes of the actual packages of shuffled playing cards on the carrier 9 by reading its ID codes when the carrier 9 starts from the backyard 8 to one of the places of playing tables 11 and memorize these ID codes as a start point, a checking step for checking all of existing ID codes of the packages 2 of shuffled playing cards on the carrier 9 are same with the ID codes as a start point by reading its ID codes on the carrier 9 when the carrier 9 has arrived at one of the places of playing tables 11, and a reporting step for reporting the results of checking step whether or not there is any lost or unknown package 2 with its ID code of the package on the carrier 9 with each places of the carrier 9 to an administrating section.

The method has further a monitoring step for monitoring each of the ID codes by reading ID codes 4 of the actual packages 2 of shuffled playing cards being carried by carriers 9 at places of each carriers at predetermined timings and reporting these ID codes of the packages 2 on each carrier 9 with each places of the carrier 9 to the administrating section.

The method has further an administrating step for administrating a number of all actual packages 2 of shuffled playing cards at the backyard 8 and at every one of the places of playing tables 11 and recognizing whether or not there is a lost package on any carrier 9 during the carrying step by comparing all of existing actual ID codes on each carriers 9 with the information of all of ID codes of the packages of which being obtained when these packages have been brought into the backyard 8.

The method for administrating a package of shuffled playing cards according to various embodiments discussed herein, wherein each carrying paths of all carries 9 for carrying the packages 2 from the backyard 8 to one of the places of playing tables or further to the disposition place 10 are being preliminary fixed and monitored in the carrying step.

Figure 16:
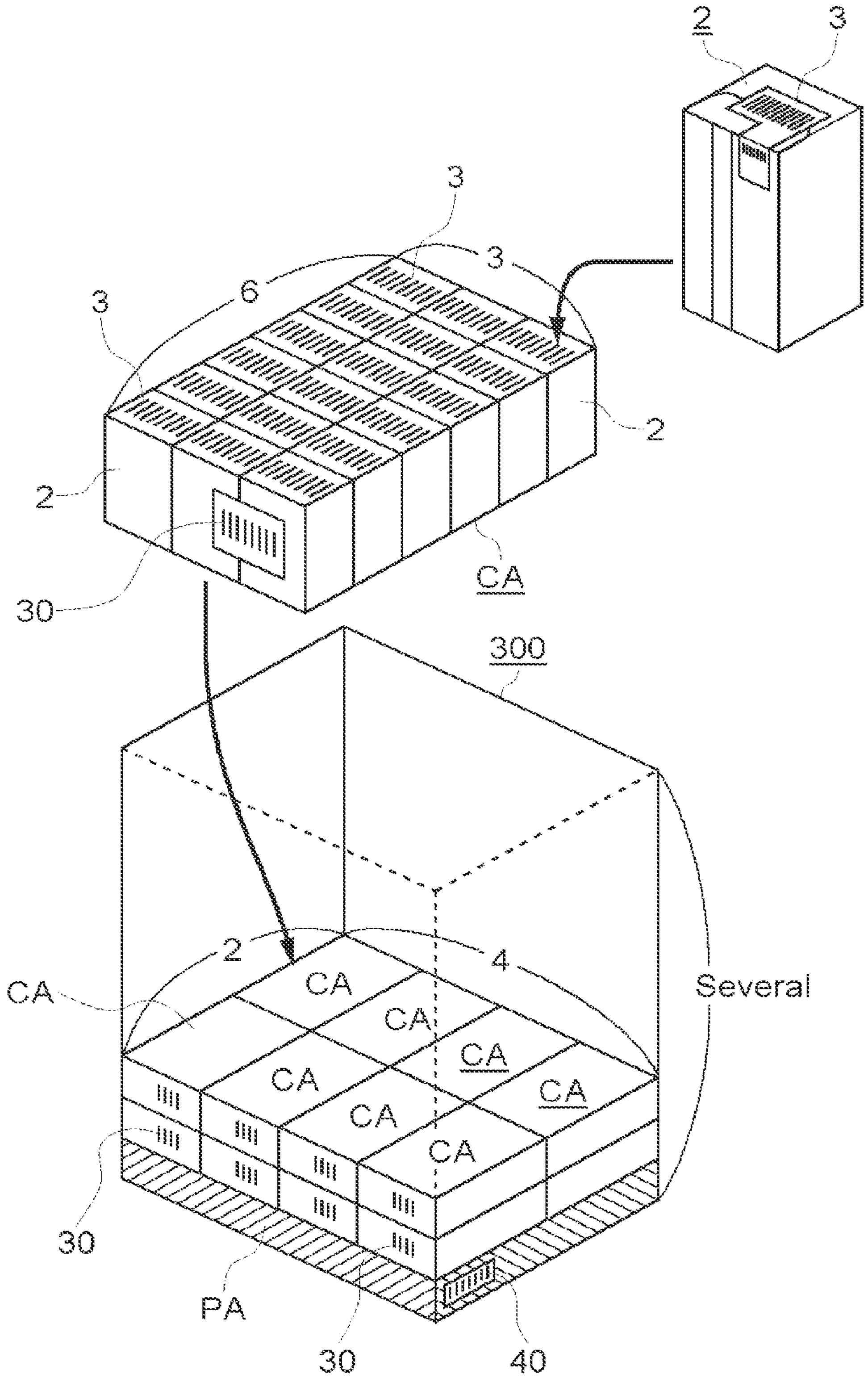
FIG. 16 is a perspective view of shuffled playing cards to be carried from a factory to a casino as a package, cartons and a form of pallet.

The packages 2 of shuffled playing cards herein, multiple packages 2 are contained in the carton CA and multiple cartons CA are contained in a container 300 on a pallet PA. Like in FIG. 16, a carton ID by using a carton barcode 30 is attached to the each carton CA and a container ID by using a container barcode 40 being attached to the container 300 and the each carton ID and the container ID provide all information of ID codes of the packages 2 of shuffled playing cards contained in the carton CA or the container 300 with providing a data base of these ID codes of the packages 2. The cartons IDs are registered in the database with relations to the ID codes of the packages 2 of shuffled playing cards contained in the carton CA and the container ID registered in the database with relations to the cartons IDs contained in the container 300 and also relations to all of the packages 2 of shuffled playing cards contained in the container 300. The carton ID or the container ID may be used to register all of ID codes of the packages 2 by using the database when these packages are brought into the backyard 8 of the casino 6.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgement or any form of suggestion that the prior art forms part of the common general knowledge in Australia.

Various embodiments have been described above and can also include an applicable combination of the following annexes.

(Annex 1)

Figure 18:
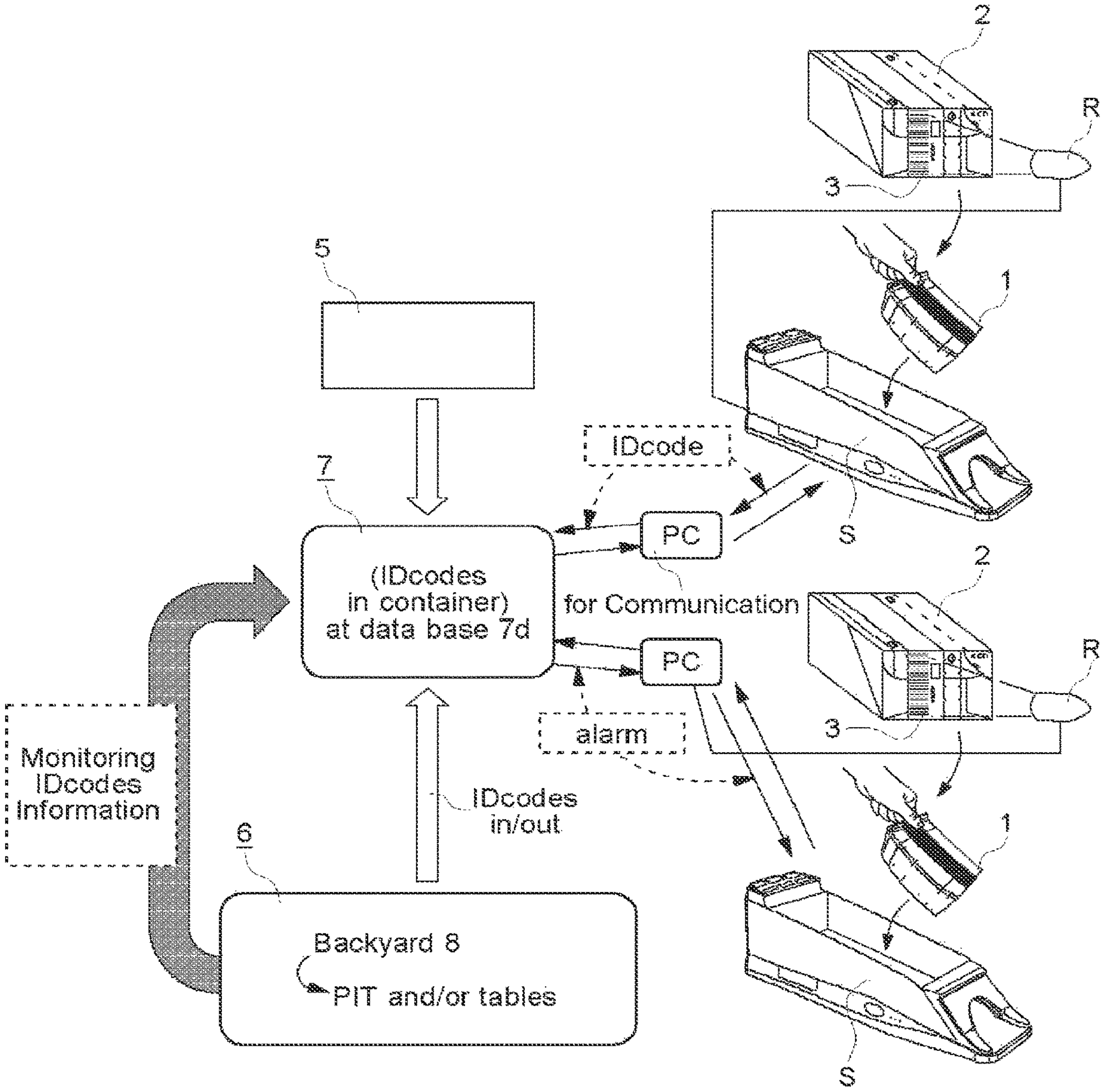
FIG. 18 is a diagram schematically showing the entirety of a system for administrating a package of shuffled playing cards.

A system for administrating a package of shuffled playing cards (see FIG. 18), wherein a predetermined number of decks of playing cards are shuffled in a random order and individually packaged as one package 2, a unique ID code 3 is attached to the package 2 of each unique shuffled playing card the system having: an ID code reader R disposed at the game table 11 configured to obtain the ID code 3 of the packages 2 at the game table 11 to identify the package 2 which will be used on a game table 11 with a card dealing shoe S, and an administrating controller 7 for monitoring the ID code 3 of package 2 of shuffled playing cards, having computer readable medium that stores a data base **7*d* of ID codes of the packages which have been brought into a backyard 8 of casino 6, the administrating controller 7 is configured to obtain the ID code 3 of the package 2 to be used on the game table 11 being read by the ID code reader R and examine whether the ID code 3 read on the game table 11 is the one preliminarily being existed for the proper use in the data base 7*d***.

(Annex 2)

The system for administrating a package of shuffled playing cards according to annex 1, wherein the administrating controller is configured to examine whether the package of the ID code read on the game table is the one not expected to be on the game table or the one arrived at unexpected timing.

(Annex 3)

The system for administrating a package of shuffled playing cards according to annex 1, wherein the administrating controller is configured to be programmed to examine the package by at least one of the followings items:

1) whether it was carried from predetermined delivery route,
2) whether it was not missing one,
3) whether it has not been registered in the data base,
4) whether it has been unused in the pit more than predetermined period,
5) whether it was carried from unexpected pit or without passing any pit,
6) whether it had been used at any game table in the past.

(Annex 4)

The system for administrating a package of shuffled playing cards according to annex 1, wherein the ID code reader is connected to the card dealing shoe on the game table and configured to send the ID code of the packages through the card dealing shoe to the administrating controller to identify the ID code of the package for the next use.

(Annex 5)

The system for administrating a package of shuffled playing cards according to annex 1, wherein at least one of the following items is stored in the computer readable medium in connection with the ID code of the package of shuffled playing cards and further examined whether the package of the ID code read on the game table is not expected or unexpected timing by these items:

(1) the game table to be used;
(2) the dealer (person who draws cards) in charge of the game table to be used;
(3) the expected end time of the use of each package of shuffled playing cards on the game table;
(4) the information concerning the pit or the card room where each package of shuffled playing cards are expected to be carried before it is delivered to the relevant game table.

(Annex 6)

The system for administrating a package of shuffled playing cards according to annex 1, wherein the ID code of the package being read for the next use will be deleted or acknowledged as the one having been used at the game table by the administrating controller.

(Annex 7)

The system for administrating a package of shuffled playing cards according to one of annex 1, wherein the card dealing shoe has an output means for alarming the examined results of the ID code of the package for the next use about the existence of any suspicious package for preventing the usage of the suspicious package.

(Annex 8)

The system for administrating a package of shuffled playing cards according to one of annex 1, wherein the card dealing shoe has a lock means for preventing a usage of the detected suspicious package by the examined results of the ID code of the package or an instruction for not using the next use by an user of a casino.

The card dealing shoe may also has an alarm function for alarming to prevent a usage of the package by an instruction for not using the next use by an user of a casino according to an instruction from the administrating controller.

(Annex 9)

The system for administrating a package of shuffled playing cards according to one of annex 1, wherein the card dealing shoe has a lock means for preventing a usage of the package by the examined results of the ID code of the package for the next use, and wherein the administrating controller may identify or designate ID code of the package which shall not be used at the game table.

(Annex 10)

The system for administrating a package of shuffled playing cards according to the annex 1, all of the ID code of the packages which have been brought into the back yard are provided by a factory who has made the packages and registered in the computer readable medium that stores the data base, a container ID, a pallet ID or a carton ID may be used for registering the ID codes of the packages wherein each ID codes of the packages which have been brought into a backyard of casino are associated with the container ID, the pallet ID or the carton ID which the packages are stored thereof (Annex 11)

The system for administrating a package of shuffled playing cards according to annex 10, the administrating controller is configured to search from the each ID code of the package to the place where the package exists or the administrating controller is configured to search the ID code of the package identified from a container ID, a pallet ID or a carton ID which has stored the packages and prohibit the packages from being used at the game table.

(Annex 12)

The system for administrating a package of shuffled playing cards according to one the annex 1, multiple packages are carried on a vehicles for transferring the packages of shuffled playing cards from a backyard to the pits for game tables and are monitored while carrying on routes by the administrating controller whether there is any lost package or not by reading each ID code of the package.

(Annex 13)

The system for administrating a package of shuffled playing cards according to one the annex 1, multiple packages are monitored by reading each ID code of the package at predetermined places from the backyard to the pits or the game tables and registered in computer readable medium by the administrating controller.

(Annex 14)

The system for administrating a package of shuffled playing cards according to the annex 1, all of the ID code of the packages which have been brought into the back yard are administrated with a group of packages which have been contained in one container and ID codes of the group of packages are registered and the number or ID codes of the packages unused in the group of packages are monitored or detected.

(Annex 15)

A keeping box for containing one or more packages of shuffled playing cards and monitoring ID codes attached to the packages which has one or more readers configured to read the ID code of package of shuffled playing cards in the keeping box, a communication means for sending information or image(s) obtained by the reader to outside the keeping box and a lock means configured to prevent taking off the package from the keeping box. And the keeping box may be able to connect a carrier to carry the one or more packages. The keeping box may have a carrying function to carry the one or more packages.

(Annex 16)

Figure 19:
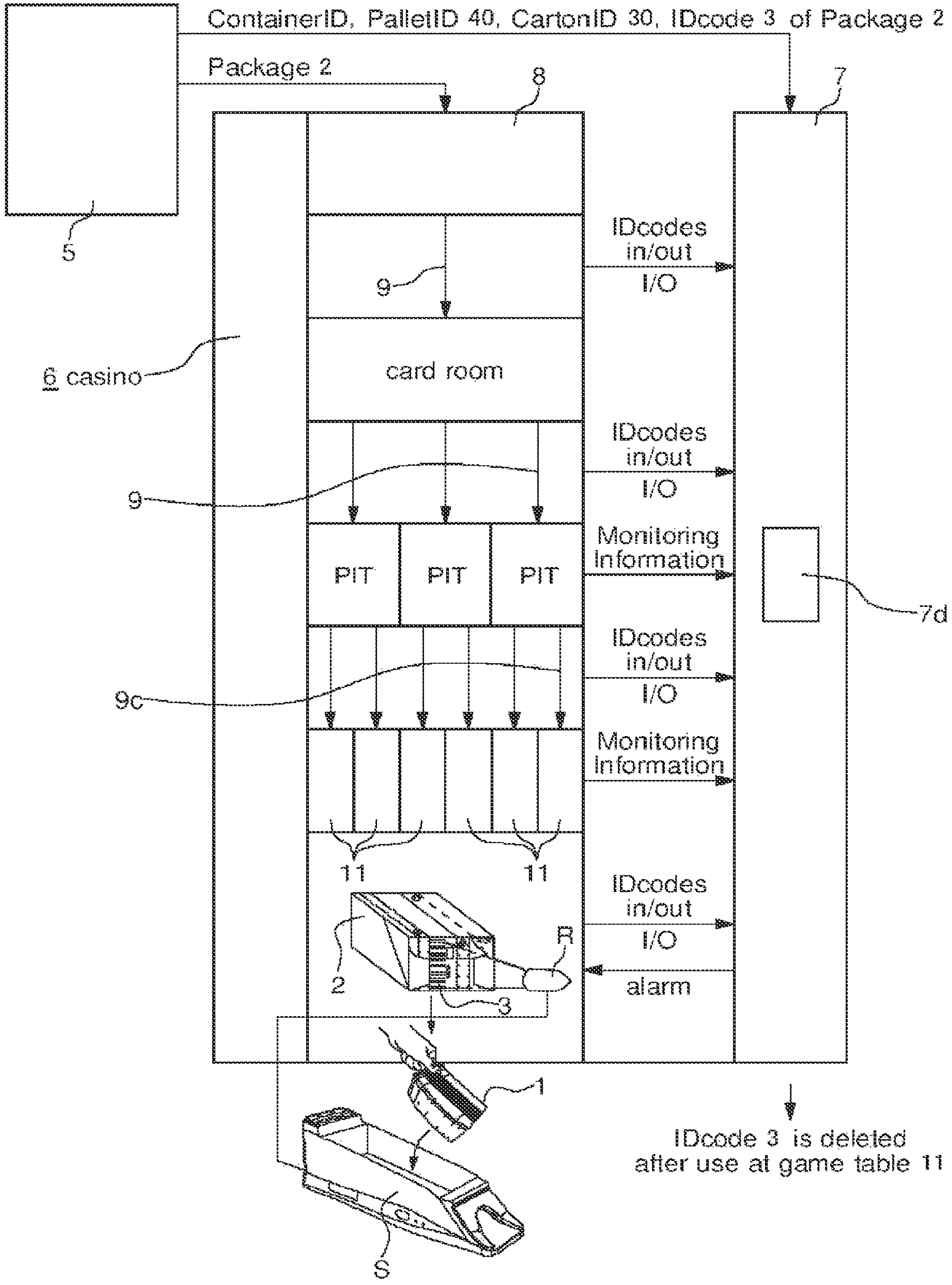
FIG. 19 shows information flow in a system for administrating a package of shuffled playing cards.

A method for administrating a package of shuffled playing cards (see FIG. 19), wherein a predetermined number of decks of playing cards are shuffled in a random order and individually packaged as a set of shuffled playing cards, an ID code 3 is attached to the package 2 of the set, the method having the steps of:

a registering step of registering to a data base 7*d*, all of ID codes of the packages which have been brought into a backyard 8, a carrying step of carrying the packages 2 of the sets of shuffled playing cards by using plural carriers 9 from the backyard 8 to one of pits 10 or playing tables 11, and, an administrating step 7 of administrating numbers of the packages 2 of shuffled playing cards and ID codes 3 of the packages at each places (8, 10,11) which are the backyard 8 and pits 10 or playing tables 11 by way of monitoring every ID codes 3 of the packages 2 of shuffled playing cards at each places (8, 10, 11) and of detecting whether or not each package exists at authorized or programmed place in each predetermined timing, wherein the ID code of the package which has been arrived at playing tables for the next use of a game is read by the ID code reader and registered to the data base as the one having been used for the game or deleted from the data base.

(Annex 17)

The method for administrating a package of shuffled playing cards according to annex 16, the method further having in/out checking step for checking whether or not the ID code read at the place have been existed before coming to the place by reading each ID code of package which is brought in or out at each place.

(Annex 18)

The method for administrating a package of shuffled playing cards according to annexes 16 or 17, the administrating step further having a reporting step of reporting or alarming about the ID code of any unauthorized, unexpected or deficiency package with the place or the carrier where this fact is found. The registering step is configured to register in/out information I/O of each ID code of package carried in or out at each places (8, 10, 11) to a data 7*d*.

The reporting step may also report about the ID code of the package which has been arrived inappropriate timing.

(Annex 19)

The method for administrating a package of shuffled playing cards according to annex 16, the method further having in/out checking step by reading each ID code of package which is brought in or out at each place, and checking step whether or not all ID codes read at each places match with the ID codes registered in the registering step.

(Annex 20)

The method for administrating a package of shuffled playing cards according to annexes 16 to 19, the administrating step further having a movement checking step of obtaining every ID codes of the packages of shuffled playing cards at least two places in predetermined period of times, grasping inventory information at each place from the ID code obtained at each place, and checking whether or not a predetermined movement between at least two places has been carried out.

(Annex 21)

The method for administrating a package of shuffled playing cards according to annex 16, wherein carrying paths of carries for carrying the packages from the backyard are being monitored in the carrying step.

(Annex 22)

The method for administrating a package of shuffled playing cards according to annex 16, wherein multiple packages are contained in a container where a container ID being attached to the container and the container ID provides all information of ID codes of the packages of shuffled playing cards contained in the container.

(Annex 23)

The method for administrating a package of shuffled playing cards according to annex 16, wherein the container ID is used for registering all of ID codes of the packages which have been brought into the backyard.

(Annex 24)

The method for administrating a package of shuffled playing cards according to annex 16 in the administrating step, wherein each ID code of the package which has been arrived at playing tables is read by an ID code reader at the playing tables before using the package for the game and registered to the data base as the one having been used for the game.

(Annex 25)

The method for administrating a package of shuffled playing cards according to annex 16, wherein one or more packages are stored in a keeping box at least at one of pits or playing tables, and the keeping box is for containing one or more packages of shuffled playing cards for the method for administrating a package of shuffled playing cards.

(Annex 26)

The method for administrating a package of shuffled playing cards according to annex 16, wherein a keeping box is used for keeping or carrying one or more packages, and the keeping box has a reader for reading all of the ID codes of packages of in the keeping box, a communication means for sending information obtained by the reader to outside the keeping box and a lock means to prevent taking off the package from the keeping box.

(Annex 27)

The method for administrating a package of shuffled playing cards according to annex 16, wherein the ID code reader is selected from at least a barcode reader, a 2-dimensional code reader, a camera or RFID tag reading means.

(Annex 28)

A package of shuffled playing cards to be used in a system for administrating a package of shuffled playing cards, wherein: a predetermined number of decks of playing cards are shuffled in a random order and individually packaged as one package, each unique ID code is attached to the package of each shuffled playing cards, the ID code is read by an ID code reader disposed at a game table configured to obtain the ID code of the packages at the game table to identify the package which will be used on the game table with a card dealing shoe, and the ID code is configured to be examined whether the package of the ID code read on the game table is the one not expected to be on the game table or the one arrived at unexpected timing by the system for administrating the package of shuffled playing cards.

(Annex 29)

The package of shuffled playing cards according to annex 28, wherein the card dealing shoe has a output means for alarming the examined results of the ID code of the package for the next use for preventing the usage of the package.

(Annex 30)

The package of shuffled playing cards according to claim 28, wherein the card dealing shoe has a lock means for preventing a usage of the package by the examined results of the ID code of the package for the use.

(Annex 31)

The package of shuffled playing cards according to claim 28, wherein, the ID code reader is connected to the card dealing shoe on the game table and configured to send the ID code of the packages through the card dealing shoe to the administrating controller to identify the ID code of the package for the next use by the system for administrating the package of shuffled playing cards.

(Annex 32)

A card dealing shoe for a package of shuffled playing cards to be used in a system for administrating the package of shuffled playing cards, wherein: a predetermined number of decks of playing cards are shuffled in a random order and individually packaged as one package, each unique ID code is attached to the package of each shuffled playing cards, the ID code is read by an ID code reader disposed at a game table configured to obtain the ID code of the packages at the game table to identify the package which will be used on the game table with the card dealing shoe, and the ID code is configured to be examined whether the package of the ID code read on the game table is the one not expected to be on the game table or the one arrived at unexpected timing by the system for administrating the package of shuffled playing cards.

(Annex 33)

The card dealing shoe for package of shuffled playing cards according to annex 32, wherein the card dealing shoe has a output means for alarming the examined results of the ID code of the package for the use for preventing the usage of the package.

(Annex 34)

The card dealing shoe for the package of shuffled playing cards according to annex 32, wherein the card dealing shoe has a lock means for preventing a usage of the package by the examined results of the ID code of the package for the use.

(Annex 35)

The card dealing shoe for the package of shuffled playing cards according to annex 32, wherein the ID code reader is directly or indirectly connected to the administrating controller configured to send the ID code of the packages to identify the ID code of the package for the next use and the administrating controller instruct the card dealing shoe for the function of allowing delivering or not the cards of package from the shoe.

(1) In case of using the data from a factory and the data obtained from the result of reading the ID code of the package by the card dealing shoe: i) Only the card packaged in the package with the correct barcode delivered from the factory can be used at the card dealing shoe. If the package has the barcode other than the above, the card shoe will read the barcode, and will generate a signal or actuate the card lock in order to prevent the usage of the package. ii) If the package has stayed at casino longer than the predetermined period of time, the card dealing shoe will read the barcode of such package, and will generate a signal or actuate the card lock in order to prevent the usage of the package (period of time can be predetermined as one likes). iii) The number of the packages stocked can be determined container by container. iv) The number of the packages stocked can be determined in all of the containers. v) If the package was used at the certain game table, the card shoe will read the barcode of such package, and will generate a signal or actuate the card lock in order to prevent the usage of the package.

(2) In case of having the function to obtain the moving information of the packages in casino floor: i) Only the card packaged in the package with the correct barcode delivered from the factory can be used at the card dealing shoe. If the package has the barcode other than the above, the card shoe will read the barcode, and will generate a signal or actuate the card lock in order to prevent the usage of the package. ii) If the package has stayed at casino longer than the predetermined period of time, the card dealing shoe will read the barcode of such package, and will generate a signal or actuate the card lock in order to prevent the usage of the package (period of time can be predetermined as one likes). iii) The number of packages stocked in each area and the codes of the stocked packages can be (expectedly) grasped anytime. For example, it can be grasped like "In XXX area the total number of the packages coded YYY and coded ZZZ should be WWW." iv) All the container's packages' expectedly stocked area can be grasped. v) If there is a package that has been staying in certain area for a long time, the software informs (alarms), or if the package arrives at the card dealing shoe, the card dealing shoe signals or locks for preventing using of the cards. vi) If the already carried package has not yet been arrived into the next place in certain area, the package can be checked. In addition, if the package has not been carried via the right way (for example, "backflow"), or the package has been arrived through pits (plural), or the package has skipped over the place, the software informs the occurrence of such error. If the package arrives at the card dealing shoe eventually, the card dealing shoe signals or locks for preventing using the cards. vii) When the cards have problems, the software informs the area where the other cards that were contained in the same carton the problem cards were contained, and when the cards arrive at the card dealing shoe, the card dealing shoe signals or locks for preventing using the cards.

(3) In case of keeping on reading the barcode of the package and checking whether the package exist at the predetermined place by using stock information obtained by the reading of the barcode.

In this case, the items listed in the above (1) and (2) can be implemented as a matter of course.

(4) In case of keeping on reading the barcode of the package during the movement of package If a package is lost for the predetermined period of time during the movement of the package, we can tell that package as suspicious by using software, and when the package arrives at the card dealing shoe, the card dealing shoe generate a signal or actuate the lock for preventing using the cards: i) A package software can tell the casino side as an alarm whether or not there is the possibility of the dangerous matter having been occurred. Moreover, when the suspicious package arrives at the card dealing shoe, the cards in the suspicious package cannot be used at the card dealing shoe, which will leads to sense of security for casino. ii) Not only the self-checking function for security in system, but also in case of rejecting the package manufactured on the specific date since they are suspicious, and/or in case of considering the card which is contained in the same carton as suspicious, the software has the function to search for which area the said one exist now. The card dealing shoe can generate a signal, actuate the lock for preventing using the cards and collect the said one.

REFERENCE SIGNS LIST

1 card
1*s* shuffled playing card set
2 packages
3 barcode
4 ID codes
6 casino
7 administrating system
8 backyard
12 camera
102 card housing unit
S card shoe apparatus

The invention claimed is:

1. A management system for managing a gaming equipment in a casino equipped with a game table, wherein the gaming equipment is equipped with an RFID tag storing an ID for identifying the gaming equipment, the management system comprising:

a storage provided under the game table and configured to store the gaming equipment to be used on the game table;

a first RFID reader provided at the storage and configured to read the RFID tag of the gaming equipment stored in the storage;

a second RFID reader provided on the game table and configured to read the RFID tag of the gaming equipment brought out of the storage onto the game table; and a management control device is configured to:

cause the first RFID reader and the second RFID reader to read the RFID tag of the gaming equipment, and inspect the gaming equipment brought out of the storage onto the game table based on a reading result of the second RFID reader.

2. The management system according to claim 1, wherein the management control device is configured to output a report for outputting an alarm.

3. The management system according to claim 1, further comprising a database that stores the ID of the gaming equipment to be transferred from a backyard to a floor for use as a registered ID, wherein the management control device is configured to inspect whether the ID of the gaming equipment read by the second RFID reader is stored as the registered ID in the database.

4. The management system according to claim 1, wherein the management control device is configured to inspect whether the gaming equipment whose RFID tag was read by the second RFID reader is gaming equipment that should be brought out of the storage and located on the game table.

5. The management system according to claim 1, wherein the management control device is configured to inspect whether the gaming equipment whose RFID tag has been read by the second RFID reader is to be read by the first RFID reader.

6. The management system according to claim 1, further comprising a database that records that the RFID tag has been read by the second RFID reader, wherein the management control device is configured to inspect the gaming equipment based on the a record in the database for the gaming equipment when the RFID tag of the gaming equipment is read by the second RFID reader.

7. The management system according to claim 1, wherein the management control device is configured to inspect for inappropriate movement of the gaming equipment between a plurality of locations, including the storage and the game table.

8. The management system according to claim 1, wherein the management control device is configured to inspect whether a timing of reading of the ID is appropriate when the ID is read from the RFID tag of the gaming equipment by the second RFID reader.

9. The management system according to claim 1, wherein the storage has a cover which, when opened, allows entry/exit of the gaming equipment to/from the storage, and a locking means configured to prevent the cover from opening to prevent unauthorized extraction of the gaming equipment stored in the storage.

10. The management system according to claim 1, wherein the first RFID reader is configured to repeatedly read the RFID tag of the gaming equipment stored in the storage.

11. The management system according to claim 1, wherein the second RFID reader is configured to read the RFID tag of the gaming equipment when the gaming equipment is brought out of the storage onto the game table.

12. The management system according to claim 1, wherein the ID read by the second RFID reader is used to subsequently track the gaming equipment.

13. The management system according to claim 1, further comprising a third RFID reader provided in a backyard of the casino and configured to read the RFID tag of the gaming equipment to be transferred from the backyard to the game table, wherein the management control device is configured to inspect whether a movement of the gaming equipment from the backyard to the game table is correct.

14. The management system according to claim 1, wherein the gaming equipment that has been determined by the management control device to be located at the game table are subsequently moved to a predetermined location so that the gaming equipment is available for use by a user at the game table.

15. A management system for managing gaming equipment, wherein the gaming equipment is equipped with an RFID tag storing an ID for identifying the gaming equipment, the management system comprising:

a storage provided under a game table and configured to store the gaming equipment to be used on the game table;

an RFID reader provided at the game table and configured to read the RFID tag of the gaming equipment brought out of the storage onto the game table; and a management control device configured to determine whether the gaming equipment whose RFID tag was read by the RFID reader should be brought out of the storage and located on the game table.

16. A management system for managing a gaming equipment in a casino equipped with a game table, wherein the gaming equipment is equipped with an RFID tag storing an ID for identifying the gaming equipment, the management system comprising:

a storage provided under the game table and configured to store the gaming equipment to be used on the game table;

a first RFID reader configured to repeatedly read the RFID tag of the gaming equipment stored in the storage;

a second RFID reader provided at the game table and configured to read the RFID tag of the gaming equipment brought out of the storage onto the game table; and a management control device configured to output an alert when there is a problem based on a reading operation of the second RFID reader.

17. A management system for managing a gaming equipment in a casino equipped with a game table, wherein the gaming equipment is equipped with an RFID tag storing an ID for identifying the gaming equipment, the management system comprising:

a storage configured to store the gaming equipment to be used on the game table;

a first RFID reader provided at the storage and configured to read the RFID tag of the gaming equipment stored in the storage;

a second RFID reader provided at the game table and configured to read the RFID tag of the gaming equipment transferred from the storage to the game table; and a management control device configured to:

cause the first RFID reader and the second RFID reader to read the RFID tag of the gaming equipment, and inspect the gaming equipment transferred from the storage to the game table based on a reading result of the second RFID reader.

* * * * *